(12) United States Patent
Hagai et al.

(10) Patent No.: US 7,051,110 B2
(45) Date of Patent: May 23, 2006

(54) DATA RECEPTION/PLAYBACK METHOD AND APPARATUS AND DATA TRANSMISSION METHOD AND APPARATUS FOR PROVIDING PLAYBACK CONTROL FUNCTIONS

(75) Inventors: Makoto Hagai, Kanagawa (JP); Yoshinori Matsui, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1217 days.

(21) Appl. No.: 09/739,648

(22) Filed: Dec. 20, 2000

(65) Prior Publication Data

US 2001/0013128 A1    Aug. 9, 2001

(30) Foreign Application Priority Data

Dec. 20, 1999   (JP)   ................... 11-360245

(51) Int. Cl.
G06F 15/16 (2006.01)
(52) U.S. Cl. .................. 709/231; 709/203; 725/135
(58) Field of Classification Search ............. 709/203, 709/217–219, 231; 725/133, 135; 379/88.13
See application file for complete search history.

(56) References Cited

U.S. PATENT DOCUMENTS

| | | | |
|---|---|---|---|
| 5,442,389 A * | 8/1995 | Blahut et al. ................. 725/92 |
| 5,583,561 A * | 12/1996 | Baker et al. .................. 725/93 |
| 5,613,032 A * | 3/1997 | Cruz et al. .................... 386/69 |
| 5,659,539 A * | 8/1997 | Porter et al. ................. 709/231 |
| 5,828,370 A * | 10/1998 | Moeller et al. ............. 715/720 |
| 6,028,539 A * | 2/2000 | Matsui ......................... 341/55 |
| 6,262,723 B1 * | 7/2001 | Matsuzawa et al. ........ 715/723 |
| 6,353,930 B1 * | 3/2002 | Shimoji et al. ............. 725/110 |
| 6,418,140 B1 * | 7/2002 | Matsui ......................... 370/378 |
| 6,449,352 B1 * | 9/2002 | Takahashi et al. ..... 379/142.16 |
| 6,452,609 B1 * | 9/2002 | Katinsky et al. ............ 715/716 |
| 6,452,875 B1 * | 9/2002 | Lee et al. ................. 369/30.04 |
| 6,463,444 B1 * | 10/2002 | Jain et al. ................. 707/104.1 |
| 6,473,828 B1 * | 10/2002 | Matsui ......................... 711/104 |
| 6,535,530 B1 * | 3/2003 | Matsui ......................... 370/536 |
| 6,535,920 B1 * | 3/2003 | Parry et al. ................. 709/231 |
| 6,538,665 B1 * | 3/2003 | Crow et al. ................. 715/723 |
| 6,580,756 B1 * | 6/2003 | Matsui et al. .......... 375/240.08 |

(Continued)

OTHER PUBLICATIONS

R. Fielding et al., Hypertext Transfer Protocol -HTTP/1.1, Jun. 1999.

*Primary Examiner*—Beatriz Prieto
(74) *Attorney, Agent, or Firm*—Wenderoth, Lind & Ponack, L.L.P.

(57) ABSTRACT

A data reception/playback apparatus includes sending means for sending a transmission request to a transmission apparatus, reception means for receiving stream data transmitted from the transmission apparatus in response to the transmission request, selection means for selecting a playback start position from a playback start position table where at least one playback start position is stored, and playback means for playing the stream data. The sending means requests the transmission apparatus to transmit the table, the reception means receives the table, the selection means selects a playback start position from the table, the sending means requests the transmission apparatus to transmit the stream data from the playback start position, the reception means receives the stream data, and the playback means plays the received stream data. Therefore, even when the data reception/playback apparatus receives the stream data from some midpoint in the stream, the apparatus can correctly play the stream data.

11 Claims, 18 Drawing Sheets

U.S. PATENT DOCUMENTS

| | | |
|---|---|---|
| 6,587,985 B1 * | 7/2003 | Fukushima et al. ......... 714/748 |
| 6,684,354 B1 * | 1/2004 | Fukushima et al. ......... 714/718 |
| 6,721,490 B1 * | 4/2004 | Yao et al. ..................... 386/69 |
| 6,732,313 B1 * | 5/2004 | Fukushima et al. ......... 714/748 |
| 6,891,799 B1 * | 5/2005 | Hagai et al. ................. 370/235 |

* cited by examiner 401 data reception/playback apparatus 801 data reception/playback apparatus

Fig.16

| playback speed 1601 | file name 1602 |
|---|---|
| 1.0 | stream.mpg |
| 2.0 | stream_s2.mpg |
| 3.0 | stream_s3.mpg |

1701 data reception/playback apparatus

DATA RECEPTION/PLAYBACK METHOD AND APPARATUS AND DATA TRANSMISSION METHOD AND APPARATUS FOR PROVIDING PLAYBACK CONTROL FUNCTIONS

FIELD OF THE INVENTION

The present invention relates to methods and apparatuses for transmitting, receiving, and playing audio data or video data (moving pictures, still pictures, graphics, etc.) through a network.

BACKGROUND OF THE INVENTION

In recent years, the Internet has attracted attention as a means for exchanging information. As devices which are connectable to the Internet, such as personal computers, mobile terminals, handy phones and the like, are increasing, the Internet has come into general use. The WWW (World Wide Web) is the most popular system for providing information through the Internet, and the WWW employs the HTTP (Hyper Text Transfer Protocol) as a data transmission protocol.

FIG. 17 is a diagram illustrating the flow of messages between a data transmission apparatus (HTTP server) 1702 and a data reception/playback apparatus (HTTP client) 1701 using the HTTP.

Initially, the data reception/playback apparatus 1701 conducts an HTTP connection to the transmission apparatus 1702, and transmits a request for data transmission 1703. The transmission request 1703 is given an identifier corresponding to data (hereinafter referred to as data identifier 1704), which is called a URI (Universal Resource Identifier), whereby the data reception/playback apparatus 1701 can request the transmission apparatus 1702 to transmit desired data. The transmission apparatus 1702 analyzes the transmission request 1703, stores the data corresponding to the data identifier 1704 in a transmission response 1705, and transmits the data of the transmission response 1705 to the data reception/playback apparatus 1701. The data reception/playback apparatus 1701 then receives the transmission response 1705. Through the above-mentioned procedure, the data reception/playback apparatus 1701 can take (obtain) desired data from the transmission apparatus 1702.

Conventionally, data of texts, still pictures and the like have mainly been transmitted through the Internet. However, with the enlargement of network bands and the advance or audio/video compression technology in recent years, the Internet can be employed for information provision services using audio and video.

Hereinafter, with reference to FIGS. 18 and 19 a description will be given of the construction of a data reception/playback apparatus for receiving and playing stream data of audio and video, and the construction of a data transmission apparatus for transmitting stream data of audio and video to the data reception/playback apparatus.

FIG. 18 is a block diagram illustrating the construction of the data reception/playback apparatus 1701. The data reception/playback apparatus 1701 comprises: a transmission request sending means 1803 for sending a transmission request 1804; a reception (receiving) means 1806 for receiving, from the transmission apparatus 1702, a transmission response 1805 to the transmission request 1804; a reception buffer 1808 for storing the data that is received by the reception means 1806; a playback means 1812 for playing the stream data that is stored in the reception buffer 1808; and a control means 1801 for controlling the respective means mentioned above.

The data reception/playback apparatus 1701 so constructed operates as follows.

The control means 1801 instructs the transmission request sending means 1803 to send a transmission request (instruction signal 1802). The transmission request sending means 1803 sends a transmission request 1804 to the transmission apparatus 1702 according to the instruction 1802 of the control means 1801. Upon receipt of the transmission request 1804, the transmission apparatus 1702 sends a transmission response 1805 to the receiving/playback apparatus 1701. As the result, the receiving means 1806 receives the transmission response 1805.

The receiving means 1806 stores data 1807 of the transmission response 1805 in the reception buffer 1808. At this time, the receiving means 1806 sends a notice of reception 1809 to the control means 1801. Upon receipt of the notice of reception 1809, the control means 1801 instructs the playback means 1812 to play the data 1811 that is stored in the reception buffer 1808 (instruction signal 1810). The playback means 1812 plays the data 1811 that is read from the reception buffer 1808, and outputs the played data as an output signal 1813.

Next, a description will be given of the transmission apparatus 1702. FIG. 19 is a block diagram illustrating the construction of the transmission apparatus 1702. The transmission apparatus 1702 comprises: a transmission request reception means 1902 for receiving and analyzing a transmission request 1901 from the reception/playback apparatus 1701; a file selection means 1904 for selecting, from a data storage means 1907, a file corresponding to a data identifier (URI) 1903 which is included in the transmission request 1901 (in this description, a file is defined as stream data which is recorded in a specific format); a file reading means 1906 for reading data from the file according to an instruction 1905 of the file selection means 1904; and a transmission means 1909 for transmitting the data that is read by the file reading means 1906.

The transmission apparatus 1702 so constructed operates as follows. The transmission request reception means 1902 receives and analyzes the transmission request 1901. Then, the transmission request reception means 1902 extracts the data identifier 1903 from the transmission request 1901, and informs the file selection means 1904 of the data identifier 1903. The file selection means 1904 selects a file corresponding to the data identifier 1903 from the data storage means 1907, and informs the file reading means 1906 of the selected file 1905. The file reading means 1906 reads data of the selected file 1905 from the data storage means 1907. The transmission means 1909 transmits the data 1908 that is read by the file reading means 1906 as a transmission response 1910.

As described above, the reception/playback apparatus 1701 plays the audio or video that is transmitted from the transmission apparatus 1702 through the network.

Further, FIG. 9 shows the case where plural stream data are simultaneously received and synchronously played by using the data reception/playback apparatus 1701 and the data transmission apparatus 1702. As shown in FIG. 9, the data reception/playback apparatus 1701 outputs a transmission request for plural stream data to the transmission apparatus 1702 by using plural HTTP connections, and receives the plural stream data simultaneously to play them synchronously.

However, since the HTTP is not a protocol which is designed for audio/video transmission, HTTP cannot provide playback control functions which are useful in audio/video playback, such as a playback from some midpoint in stream data, a suspension of playback, a change of playback speed, and the like.

Further, when a delay in data transmission occurs due to network congestion which causes data transmission to be halted at some midpoint in the stream data being received, data playback is halted because the conventional data reception/playback apparatus cannot perform data playback from the midpoint in the stream data, resulting in lack of real-time performance in data playback.

In order to solve the above-mentioned problems, there is a move afoot to construct a protocol for audio and video only, aside from the HTTP. However, such protocol for audio and video only will be an unprecedented one and, therefore, much time and cost will be spent before it is widely available.

Further, according to the HTTP, the quantity of data to be transmitted is controlled according to network congestion. However, when performing synchronous playback of plural stream data while receiving them simultaneously, since the quantity of data to be transmitted should be controlled for each connection, the quantity of data per unit time will vary from connection to connection.

Hereinafter, this problem will be described more specifically with reference to FIGS. 10 and 11.

FIG. 10 is a graph illustrating an example of the quantity of data that is stored in the reception buffer of the data reception/playback apparatus (hereinafter referred to as "buffer quantity"). The abscissa shows the time, and the ordinate shows the buffer quantity. The data received by the reception means is successively input to the reception buffer, and the stored data is successively taken out by the playback means. FIG. 10 shows the case where two streams of data 1001 and 1002 are received and played simultaneously.

In FIG. 10, the quantity of received data gradually decreases due to network congestion or the like, and the data of the stream 1 (1001) runs out at time T1 (1003), whereby data playback is halted. Since the stream data 1 cannot be played any more, playback is halted until sufficient data is stored in the reception buffer. In this state, however, synchronous playback of the stream data 1 and the stream data 2 cannot be performed, and therefore, playback of the stream data 2 (1002) is also halted, and playback of the stream data 2 is resumed when a sufficient amount of stream data 1 is stored.

The result is shown in FIG. 11. It is assumed that the stream data 1 (1101) in the reception buffer runs out at time T1 (1103). At this time, playbacks of the stream data 1 and the stream data 2 (1002) are stopped simultaneously. However, since data reception is still continued in the connection of the stream data 2, the maximum buffer quantity is exceeded at time T2 (1104). As the result, synchronous playback of plural stream data while receiving them simultaneously cannot be achieved.

SUMMARY OF THE INVENTION

The present invention is made to solve the above-described problems. Accordingly, an object of the present invention is to provide a data reception/playback method, a data reception/playback apparatus, a data transmission method, and a data transmission apparatus which are able to realize playback control functions that are useful in audio/video playback, such as a playback from some midpoint in stream data, a suspension of playback, and a change of playback speed, when performing audio/video transmission using the HTTP, and to avoid degradation of a data quality and overflow of reception buffer even when a transmission delay occurs due to network congestion.

Other objects and advantages of the invention will more become apparent from the following detailed description. The detailed description and the specific embodiments described herein are provided only for illustration since various additions and modifications within the scope of the present invention will be apparent to those of skill in the art from the detailed description.

According to a first aspect of the present invention, there is provided a data reception/playback method for receiving and playing stream data including at least one of audio and video. This method comprises the steps of: before receiving the stream data, requesting a transmitting end to transmit part or whole of a playback start position table including at least one position where data playback can be started from some midpoint in the stream data; receiving the playback start position table; selecting one playback start position from the received playback start position table; requesting the transmitting end to transmit the stream data from the selected playback start position; and receiving and playing the stream data which has been transmitted from the playback start position. In this method, a playback start position table containing playback start positions is received from the transmitting end in advance of data playback, a playback start position is selected from the table, and transmission of data from the selected playback start position is requested to the transmitting end. Therefore, data playback from some midpoint in stream data is achieved.

According to a second aspect of the present invention, in accordance with the data reception/playback method of the first aspect, the playback start position table is stored in a file which is different from a file containing the stream data, transmission of the file containing the playback start position table is requested to the transmitting end before reception of the stream data, and the playback start position table is extracted from the received file containing the table.

According to a third aspect of the present invention, in accordance with the data reception/playback method of the first aspect, the playback start position table, the stream data, and information about the position of the playback start position table are stored in one file, transmission of the file is requested to the transmitting end, and the information about the position of the playback start position table is extracted from the data of the received file. Further, transmission of the file from the position which is indicated by the information about the position of the playback start position table is requested to the transmitting end, and the playback start position table is obtained from the received data.

According to a fourth aspect of the present invention, in accordance with the data reception/playback method of the first aspect, the playback start position table received at the time of data playback is stored, and the stored table is used for the next and later data playback.

According to a fifth aspect of the present invention, in accordance with the data reception/playback method of the first aspect, when playing the stream data from the head of the stream, the stream data is received and played without requesting transmission of the playback start position table. Further, when playing the stream data from some midpoint in the stream, transmission of the playback start position table is requested.

According to a sixth aspect of the present invention, in accordance with the data reception/playback method of the third aspect, the information about the position of the playback start position table is stored at the time of data playback, and this positional information is used for the next and later data playback.

According to a seventh aspect of the present invention, there is provided a data reception/playback apparatus for receiving and playing stream data including at least one of audio and video. This apparatus comprises: transmission request sending means for sending a transmission request to a transmission apparatus; reception means for receiving data transmitted from the transmission apparatus in response to the transmission request; playback start position selection means for selecting a playback start position from a playback start position table where at least one playback start position is stored; and playback means for playing the stream data. In this apparatus, the transmission request sending means requests the transmission apparatus to transmit the playback start position table, the reception means receives the playback start position table, the transmission start position selection means selects a playback start position from the playback start position table, the transmission request sending means requests the transmission apparatus to transmit the stream data from the playback start position, the reception means receives the stream data, and the playback means plays the received stream data. This apparatus receives a playback start position table containing playback start positions from the transmission apparatus in advance of data playback, selects a playback start position from the received table, and requests the transmission apparatus to transmit data from the selected playback start position. Therefore, data playback from some midpoint in stream data is achieved.

According to an eighth aspect of the present invention, there is provided a data reception/playback method for receiving and playing stream data including at least one of audio and video. In this method, when data playback is to be halted temporarily, a request for transmission halt is made to the transmitting end by halting data reception from a lower communication protocol. Further, when data playback is to be restarted, a request for transmission restart is made to the transmitting end by restarting data reception from the lower communication protocol. In this method, since a lower communication protocol requests the transmitting end to halt data transmission by halting data reception from the lower communication protocol, a temporary halt of data playback can be achieved. Further, when restarting data playback, the lower communication protocol requests the transmitting end to transmit data by restarting data reception from the lower communication protocol.

According to a ninth aspect of the present invention, there is provided a data reception/playback method for receiving and playing stream data including at least one of audio and video. In this method, when receiving and playing plural stream data simultaneously by using plural connections which are individually controllable, if reception of stream data in a connection is delayed for a playback time, playback of all the stream data is halted, and a request for suspension of data transmission in the connections including stream data other than the stream data which is delayed in reception is output to the transmitting end. Further, when the quantity of the stream data which is delayed in reception exceeds a predetermined value, playback of all the stream data is restarted and a request for restart of data transmission in the suspended connections is output to the transmitting end. Therefore, it is possible to avoid degradation in quality of played data due to interruptions of data and an overflow of a reception buffer.

According to a tenth aspect of the present invention, there is provided a data reception/playback apparatus for receiving and playing stream data including at least one of audio and video. This apparatus comprises: transmission request sending means for requesting a transmission apparatus to transmit plural stream data; a reception means for receiving the stream data; reception buffer for storing the stream data; playback means for playing the stream data stored in the reception buffer; and reception buffer monitor means for monitoring the quantity of data stored in the reception buffer. In this apparatus, when the reception buffer monitor means detects that reception of stream data is delayed for a playback time, the playback means halts playback of all the stream data, and the transmission request sending means requests the transmission apparatus to suspend data transmission in connections including stream data other than the stream data which is delayed in reception. When the reception buffer monitor means detects that the quantity of the stream data which is delayed in reception exceeds a predetermined value, the playback means restarts playback of all the stream data, and the transmission request sending means requests the transmission apparatus to restart data transmission in the connection which is suspended. Therefore, it is possible to avoid degradation in quality of played data due to interruptions of data and an overflow of the reception buffer.

According to an eleventh aspect of the present invention, there is provided a data transmission method for transmitting stream data including at least one of audio and video according to a playback speed which is specified by a receiving end. This method comprises the steps of: having a plurality of files containing stream data of different playback speeds; receiving a request from the receiving end for the transmission of stream data including information of a playback speed; selecting a file containing stream data corresponding to the playback speed information; and transmitting the data of the selected file. Therefore, data transmission according to a desired playback speed is achieved, and the playback speed can be controlled.

According to a twelfth aspect of the present invention, there is provided a data transmission apparatus for transmitting stream data including at least one of audio and video according to a playback speed which is specified by a receiving end. This apparatus comprises: data storage means having, as files, plural stream data having different playback speeds; a playback speed/file mapping table buffer containing a playback speed/file mapping table which indicates the correspondences between the playback speeds and the files; transmission request reception means for receiving and analyzing a request for transmission stream data from the receiving end; playback speed information extraction means for extracting information of a playback speed, from the transmission request received by the transmission request reception means; file selection means for selecting a file corresponding to the playback speed with reference to the playback speed/file mapping table which is stored in the playback speed/file mapping table buffer; file reading means for reading the file selected by the file selection means from the data storage means; and transmission means for transmitting the data of the file read by the file reading means. Therefore, data transmission according to a desired playback speed is achieved, and the playback speed can be controlled.

BRIEF DESCRIPTION OF THE DRAWINGS

FIG. 16 is a diagram illustrating an example of a playback-speed/file mapping table.

DETAILED DESCRIPTION OF THE PREFERRED EMBODIMENTS

First Embodiment

Hereinafter, a data reception/playback apparatus and a data reception/playback method according to a first embodiment of the present invention will be described with reference to FIGS. 1 to 7.

The data reception/playback apparatus or method according to this first embodiment enables data playback from some midpoint in a stream of file data received by the data reception/playback apparatus. That is, the data reception/playback apparatus or method of the first embodiment enables playback of audio/video contents from an arbitrary position in stream data by the function of playing the stream data from some midpoint (hereinafter referred to as "jump playback function"), thereby improving the convenience of the data reception/playback apparatus.

Figure 1:
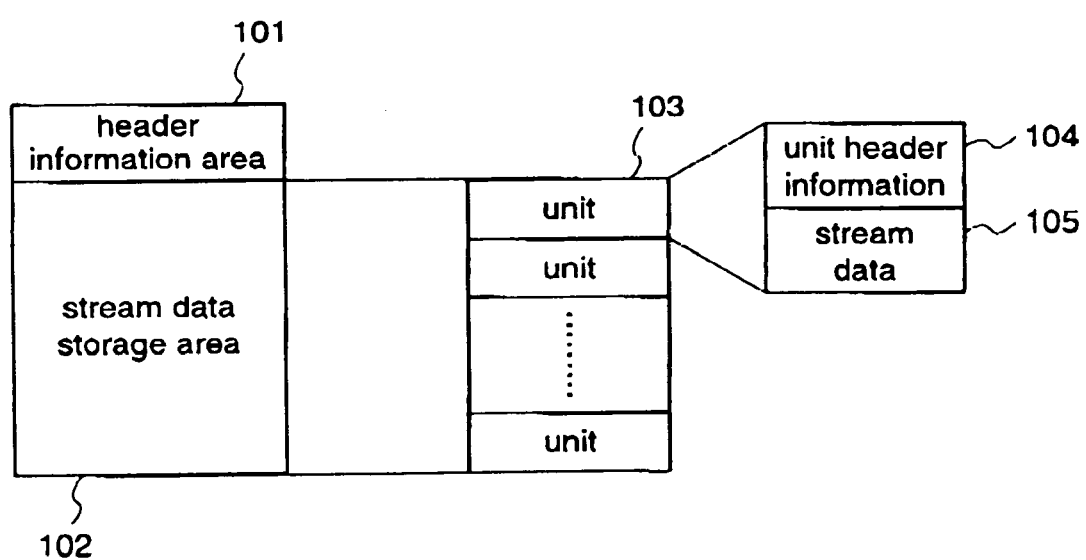
FIG. 1 is a diagram illustrating an example of a file format containing stream data.

FIG. 1 is a diagram illustrating a general file format of stream data. In FIG. 1, a stream data storage area 102 is divided into plural units, and each unit contains unit header information 104 (e.g., data size information, playback time information, and the like) and stream data 105. A header information area 101 contains information such as the types of media stored in the respective units of the stream data storage area 102.

Figure 2:
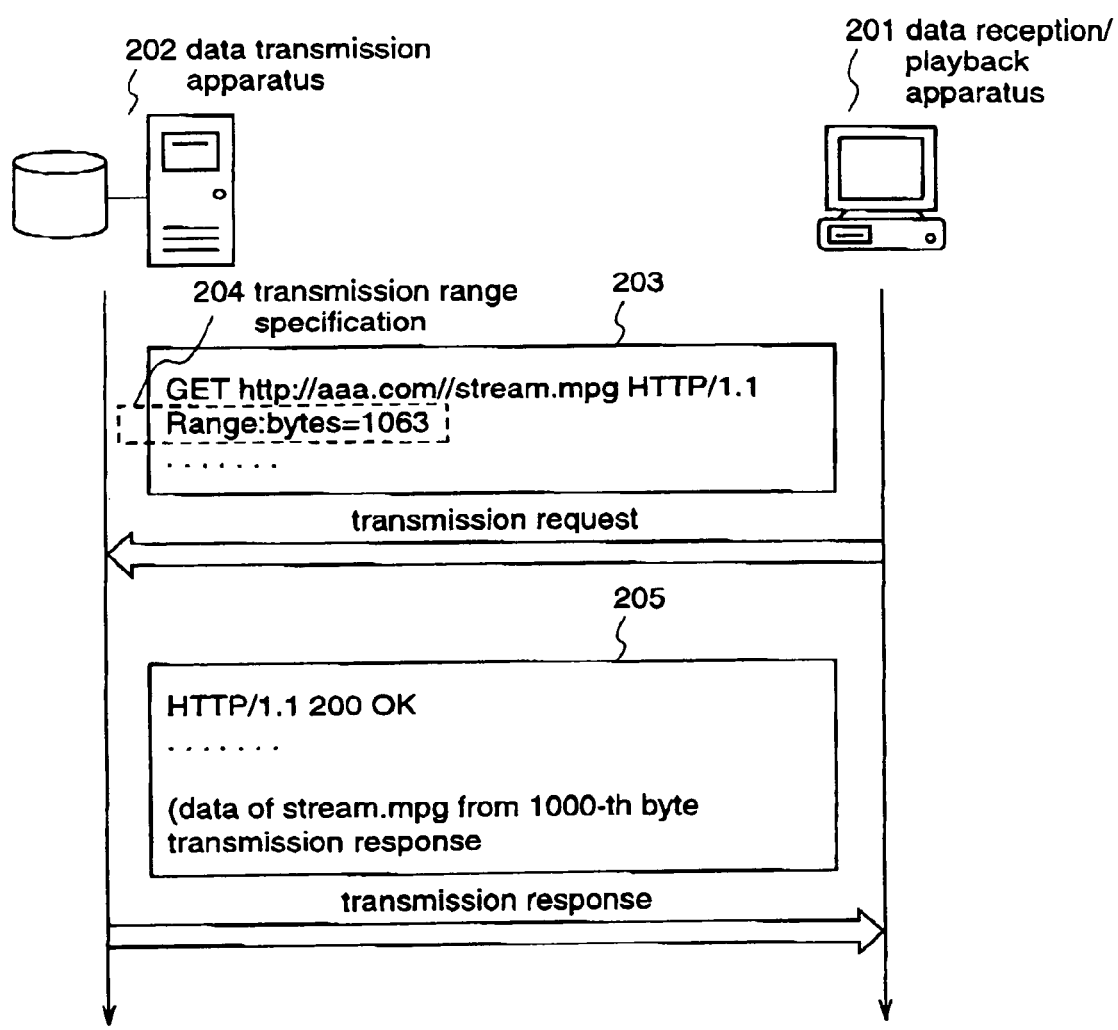
FIG. 2 is a diagram showing the flow of transmission and reception according to HTTP in the case where a range of data to be transmitted is specified.

Next, a method of receiving data from some midpoint in a file using the HTTP will be described with reference to FIG. 2. As shown in FIG. 2, in a transmission request 203 by which the data reception/playback apparatus 201 requests the transmission apparatus 202 to transmit data, a transmission range 204 indicating a transmission start position is specified separately from specifying a file to be transmitted, whereby the data reception/playback apparatus can receive the data from a desired position in the file. The specified transmission start position indicates the number of bytes from the head of the file.

Usually, the size of each unit which is included in the stream data is variable. Therefore, when the data reception/playback apparatus performs data playback from the head of the file, the data reception/playback apparatus can correctly read the stream data from the file by utilizing the size information which is included in the unit header information attached to each unit (refer to FIG. 1). However, when the data reception/playback apparatus receives the stream data from some midpoint of the file, the data reception/playback apparatus cannot specify the head position of the unit and therefore cannot read the stream data correctly.

Figure 3:
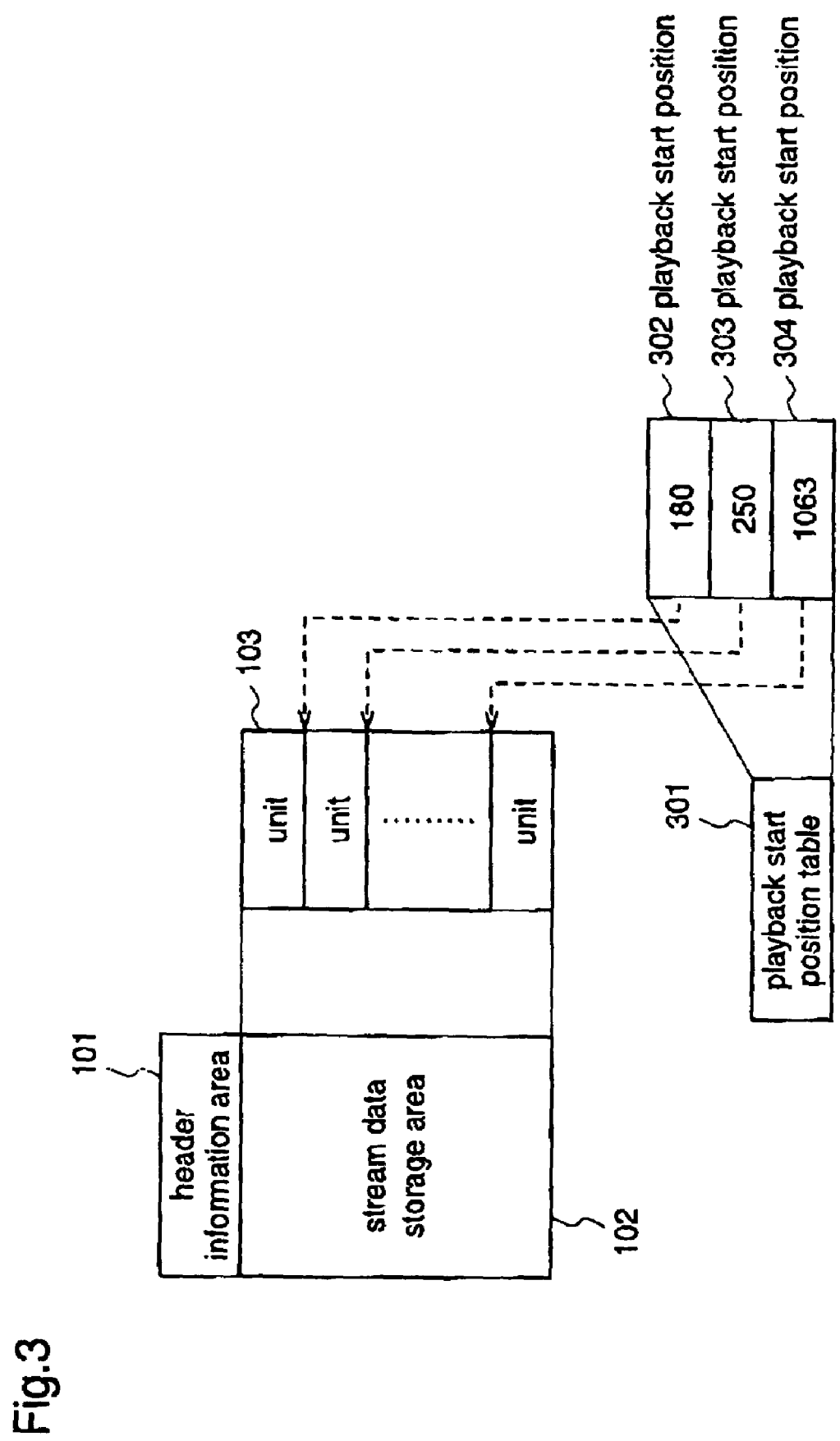
FIG. 3 is a diagram illustrating an example of a file format to be used by a data reception/playback apparatus according to a first embodiment of the invention.

In order to solve this problem, in this first embodiment, the data transmission apparatus transmits a file containing a playback start position table 301 having at least one playback start position in the file as shown in FIG. 3, separately from the file containing the stream data, and the data reception/playback apparatus makes a request for data transmission from the transmission apparatus based on the playback start position table 301.

Thereby, the data reception/playback apparatus can specify the unit head position even when the data reception/playback apparatus receives the data from some midpoint in the file. Thereby, the data reception/playback apparatus can analyze the file format to correctly take the stream data from the file. FIG. 3 shows an example of a playback start position table 301. In FIG. 3 playback start positions 302, 303, and 304 indicate, for example, the head positions of units constituting the stream data storage areas, and each playback start position indicates the number of bytes from the head position of the stream data storage area 102.

Hereinafter, with reference to FIG. 4, a description will be given of the data reception/playback apparatus according to the first embodiment which makes a request for data transmission based on the transmission start position table 301 containing the playback start positions (positions in the file where data playback is possible).

Figure 4:
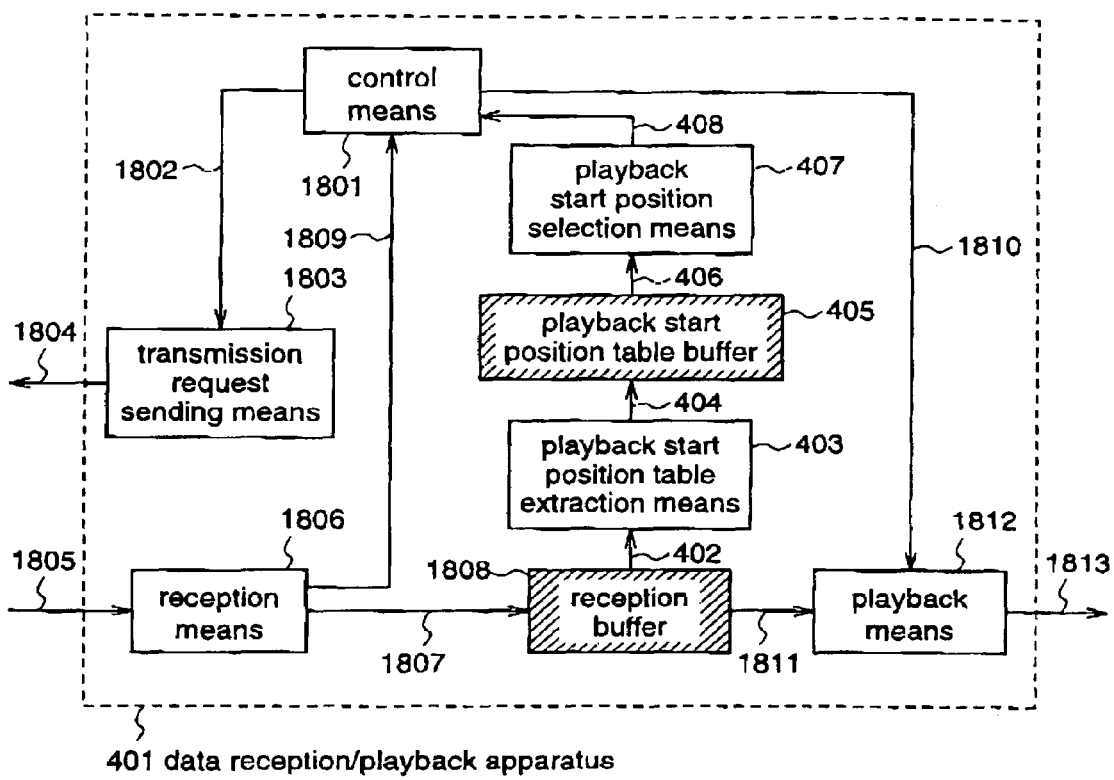
FIG. 4 is a block diagram illustrating the construction of the data reception/playback apparatus according to the first embodiment.
Figure 18:
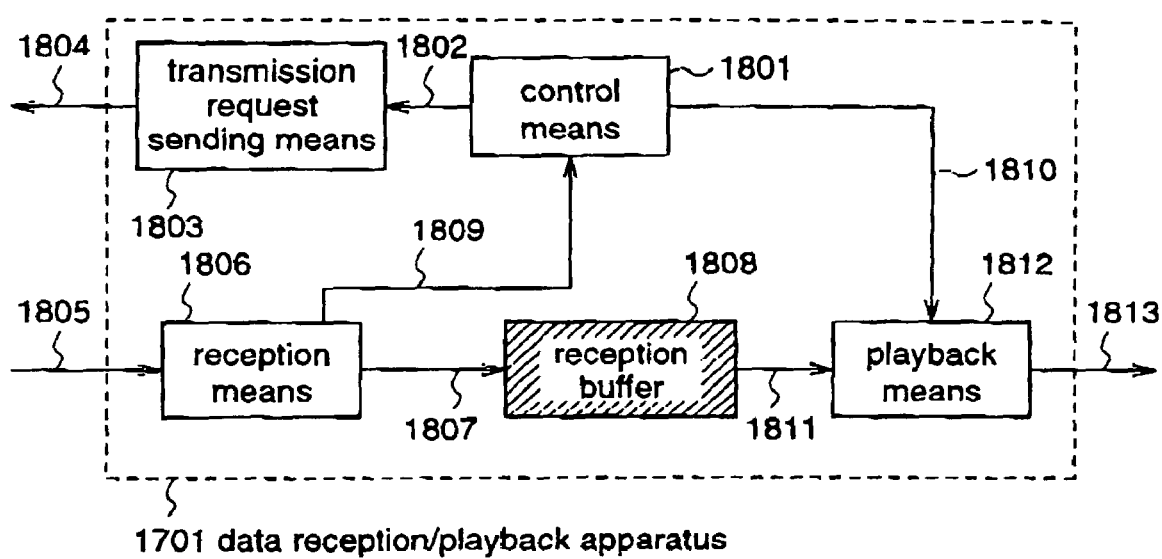
FIG. 18 is a block diagram illustrating the construction of the conventional data reception/playback apparatus.

FIG. 4 is a block diagram illustrating the data reception/playback apparatus according to the first embodiment. In FIG. 4, the same reference numerals as those shown in FIG. 18 denote the same or corresponding components and signals.

The data reception/playback apparatus 401 comprises: a control means 1801; a transmission request sending means 1803; a reception means 1806; a reception buffer 1808; a playback means 1812; a playback start position table extraction means 403 for extracting a playback start position table 404 from received data 402 that is stored in the reception buffer 1808; a playback start position table buffer 405 for storing the playback start position table 404; and a playback start position selection means 407 for selecting a playback start position 408 from the playback start position table 404 stored in the playback start position table buffer 405.

The data reception/playback apparatus 401 so constructed operates as follows.

The control means 1801 instructs the transmission request sending means 1803 to request transmission of the playback start position table from the transmission apparatus. Then, the transmission request sending means 1803 specifies, as a transmission request 1804, a data identifier of a file of the transmission start position table, and transmits the request 1804 to the transmission apparatus.

Upon receipt of the transmission request 1804 from the data reception/playback apparatus 401, the transmission apparatus analyzes the transmission request 1804, and transmits to the data reception/playback apparatus the file of the playback start position table corresponding to the data identifier.

The reception means 1806 of the data reception/playback apparatus 401 receives the file of the transmission start position table which is transmitted from the transmission apparatus as a transmission response 1805 to the transmission request 1804, and stores the data 1807 (playback start position table) of the transmission response 1805 in the reception buffer 1808.

Next, the playback start position table extraction means 403 extracts the playback start position table 404 from the data that is stored in the reception buffer 1808, and stores the extracted playback start position table 404 in the playback start position table buffer 405. Then, the playback start position selection means 407 selects a playback start position 408 from the playback start position table 406 which is stored in the playback start position table buffer 405, and outputs the selected playback start position 408 to the control means 1801.

When there are plural playback start positions in the playback start position table 406, the method of selecting a playback start position by the playback start position selection means 407 may be arbitrarily set. For example, the playback start position selection means 407 may select a playback start position which is nearest to the playback start position that is indicated by the user of the data reception/playback apparatus.

The playback start position that is indicated by the user or the like is not restricted to that which is specified by using the byte position. For example, the byte positions corresponding to the playback times at equal intervals (e.g., byte positions corresponding to the playback times 1 sec., 2 sec., 3 sec., . . . ) may be stored in the playback start position table, whereby the playback start position can be specified by the playback time.

Next, the control means 1801 instructs the transmission request sending means 1803 to make a request for transmission of stream data from the transmission start position 408 which is selected by the playback start position selection means 407. The transmission request sending means 1803 specifies a transmission range 204 as shown in FIG. 2 based on the transmission start position which is specified by the control means 1801, and sends a transmission request 1804 to the transmission apparatus. The reception means 1806 receives a transmission response 1805 in response to the transmission request 1804, and stores the stream data of the transmission response 1805 in the reception buffer 1808. The playback means 1812 plays the stream data stored in the reception buffer 1808, and outputs the played data as an output signal 1813.

As described above, according to the first embodiment, the data transmission start position from the transmission apparatus is decided based on the transmission start position table which has been previously received by the data reception/playback apparatus, whereby the data reception/playback apparatus can receive the data from the playable position such as the unit head position in the file. Therefore, even when the data reception/playback apparatus receives the stream data from some midpoint in the stream, the data reception/playback apparatus can correctly play the stream data, thereby realizing the jump playback function.

Second Embodiment

Hereinafter, a data reception/playback method and a data reception/playback apparatus according to a second embodiment of the present invention will be described.

The data reception/playback method and apparatus according to this second embodiment are different from those of the first embodiment in that the above-described playback start position table is stored in the file containing the stream data, whereas in the first embodiment the playback start position table and the stream data are stored in different files.

FIG. 5(a) shows an example of a format where a playback start position table area is placed in the vicinity of the head of a file. Although, in FIG. 5(a), the playback start position table area 301 containing the playback start position table follows the head information area 201 at the head of the file, the playback start position table area 301 may be placed before the header information area 201.

Hereinafter, the data reception/playback apparatus according to the second embodiment, which realizes the jump playback function, will be described.

The construction of the data reception/playback apparatus according to the second embodiment is identical to that of the data reception/playback apparatus already described for the first embodiment of FIG. 4 and, therefore, does not require repeated description.

Next, the operation of the data reception/playback apparatus according to the second embodiment will be described with reference to FIG. 4.

The control means 1801 instructs the transmission request sending means 1803 to make a request for the transmission of a file containing stream data. The transmission request sending means 1803 specifies, as a transmission request 1804, the data identifier of the file containing the stream data which is specified by the control means 1801, and sends the transmission request 1804 to the transmission apparatus.

Upon receipt of the transmission request 1804 from the data reception/playback apparatus 401, the transmission apparatus analyzes the transmission request 1804, and transmits to the data reception/playback apparatus the file containing the stream data corresponding to the data identifier for which the transmission request is made.

When the file containing the stream data is transmitted from the transmission apparatus as a transmission response

1805 to the transmission request 1804, the reception means 1806 of the data reception/playback apparatus 401 sequentially receives the file and stores the file containing the stream data in the reception buffer 1808.

Figure 5:
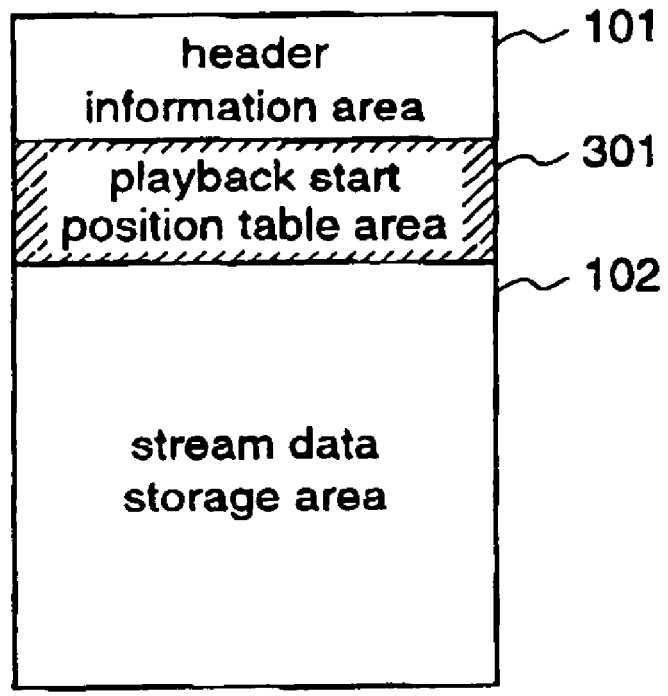
FIGS. 5(a) and 5(b) are diagrams illustrating an example of a file format to be used by a data reception/playback apparatus according to a second embodiment of the invention.
Figure 5:
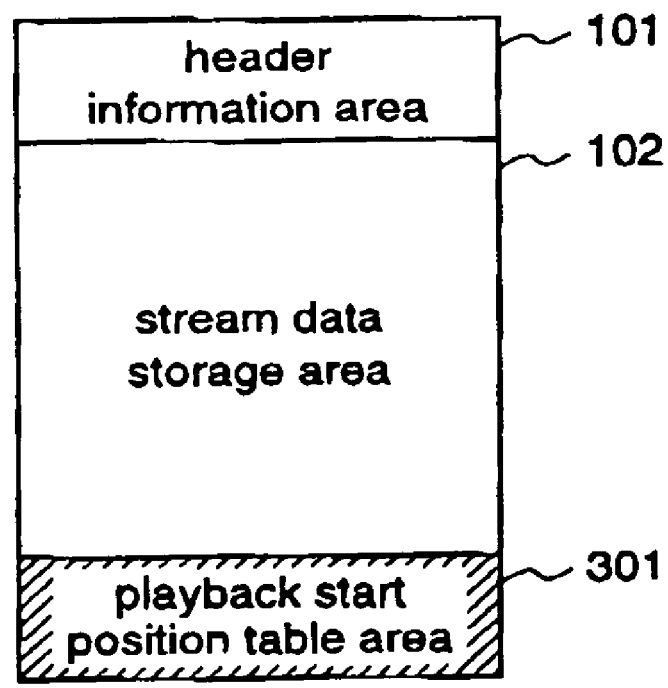

The playback start position table extraction means 403 extracts the playback start position table 404 from the playback start position table area 301 of the file shown in FIG. 5(*a*), and outputs the extracted playback start position table 404 to the playback start position table buffer 405. Since the playback start position table area 301 is placed in the vicinity of the head of the file, the playback start position table can be extracted in a short amount of time from the start of data reception.

After the playback start position table extraction means 403 extracts the playback start position table 404, the control means 1801 of the data reception/playback apparatus 401 decides whether the data is to be played from the head of the file or from some midpoint in the file. When the data is to be played from the head of the file, the stream data storage area is subsequently received and played. On the other hand, when the data is to be played from some midpoint in the file, data reception is halted temporarily, and data playback is performed from the playback start position 408 which is selected from the playback start position table by the playback start position selection means 407.

As described above, the playback start position table stored in the file is extracted in advance of data playback, and when the data is to be played from some midpoint in the file, data reception is suspended so as to decide the data transmission start position from the transmission apparatus based on the extracted playback start position table. Thereby, the data reception/playback apparatus can correctly play the stream data even when it receives the data from some midpoint in the stream data, realizing the jump playback function.

While the playback start position table is stored in the vicinity of the head of a file in the second embodiment, the table may be stored so as to occupy a fixed-size area from the end of the file.

FIG. 5(*b*) shows an example of a format where a playback start position table 301 is stored at the end of a file. According to the transmission range specification 204 by the HTTP, the transmission range can also be specified from the end of a file. When the playback start position table is stored so as to occupy a fixed-size area from the end of the file, the data reception/playback apparatus can receive the playback start position table stored at the end of the file, in advance of data reception. The transmission range specification from the end of the file by the HTTP is performed by setting the transmission range at a minus value. For example, when −1000 is specified as the transmission range, 1000 bytes of data from the end of the file are transmitted to the data reception/playback apparatus.

Hereinafter, with reference to FIG. 4, a description will be given of the operation of the data reception/playback apparatus in the case where the playback start position table is stored so as to occupy a fixed-size area from the end of a file.

The control means 1801 instructs the transmission request sending means 1803 to make a request for the transmission of a file containing stream data, and specifies the size of the playback start position table area from the end of the file, as a transmission range specification in a transmission request.

This is realized by storing the playback start position table so as to occupy a fixed-size area from the end of the file, whereby the data reception/playback apparatus can receive only the area of the playback start position table in advance of data reception.

The transmission request sending means 1803 specifies, as a transmission request 1804, the data identifier of the file containing the stream data which is specified by the control means 1801, and the size of the playback start position table area from the end of the file (transmission range specification), and sends the transmission request 1804 to the transmission apparatus.

Upon receipt of the transmission request 1804 from the data reception/playback apparatus 401, the transmission apparatus analyzes the transmission request 1804, and transmits to the data reception/playback apparatus a transmission-range-specified transmission start position table which is included in the file corresponding to the data identifier that is specified by the transmission request 1804.

When the transmission start position table, as a transmission response 1805 from the transmission apparatus, is input to the data reception/playback apparatus 401, the reception means 1806 receives the transmission start position table and stores the transmission start position table in the reception buffer 1808. The playback start position table extraction means 403 extracts the playback start position table from the buffer 1808, and outputs the extracted playback start position table 404 to the playback start position table buffer 405.

After the playback start position table extraction means 403 extracts the playback start position table 404, the control means 1801 of the data reception/playback apparatus 401 decides whether the data is to be played from the head of the file or from some midpoint in the file. When the data is to be played from the head of the file, the stream data storage area is subsequently received and played. On the other hand, when the data is to be played from some midpoint in the file, data reception is halted temporarily, and data playback is performed from the playback start position 408 which is selected from the playback start position table by the playback start position selection means 407.

As described above, even when the transmission start position table is stored so as to occupy a fixed-size area from the end of the file, since the transmission range from the end of the file is specified, the reception/playback apparatus 401 can receive the transmission start position table in advance of data reception. Therefore, even when the data reception/playback apparatus receives the stream data from some midpoint in the stream, the data reception/playback apparatus can correctly play the stream data, thereby realizing the jump playback function.

Furthermore, information indicating the position of the playback start position table in the file may be stored in the vicinity of the head of the file, and the playback start position table that is stored in the file may be extracted according to this positional information.

Figure 6:
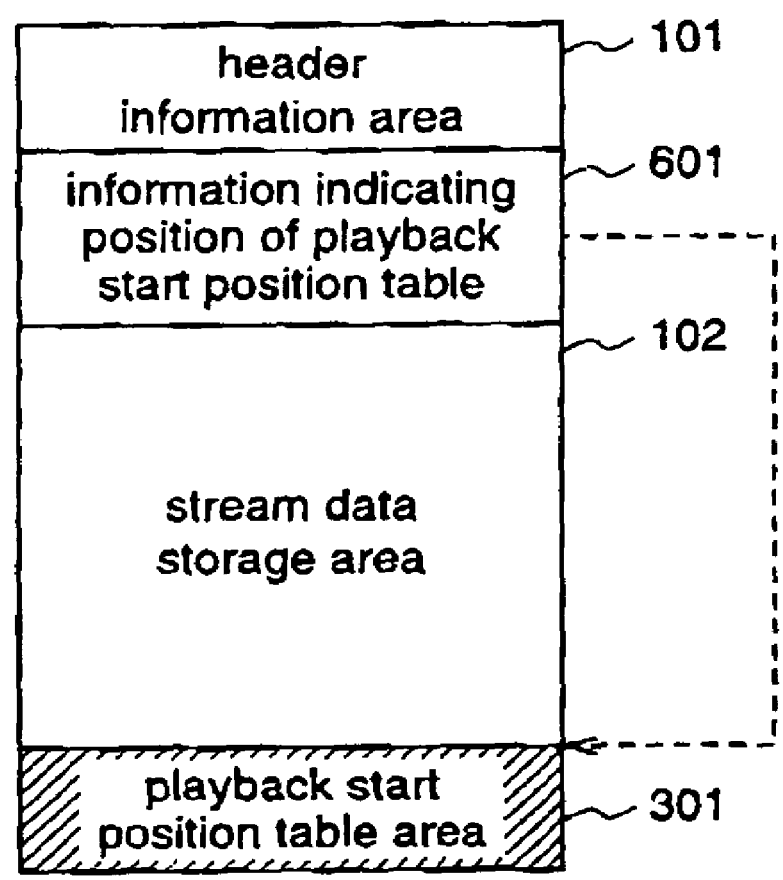
FIG. 6 is a diagram illustrating an example of a file format to be used by a data reception/playback apparatus according to the second embodiment, wherein a playback start position table and information about the position of the table are arranged.

FIG. 6 shows an example of a format where stream data, a playback start position table, and information about the position of the playback start position table are stored.

As shown in FIG. 6, information 601 indicating the position of the playback start position table is stored in the file.

The information 601 about the position of the playback start position table does not necessarily indicate the number of bytes from the head of the file to the playback start position table. For example, when the playback start position table area is placed after the stream data area, the information 601 about the position of the playback start position table corresponds to the size of the whole stream data area, and the position of the playback start position table can be calculated when the data has been received up to the head of the stream data area. That is, the position of the playback start position table is expressed by (the byte position at the head of the stream data area)+(the size of the stream data area).

Figure 7:
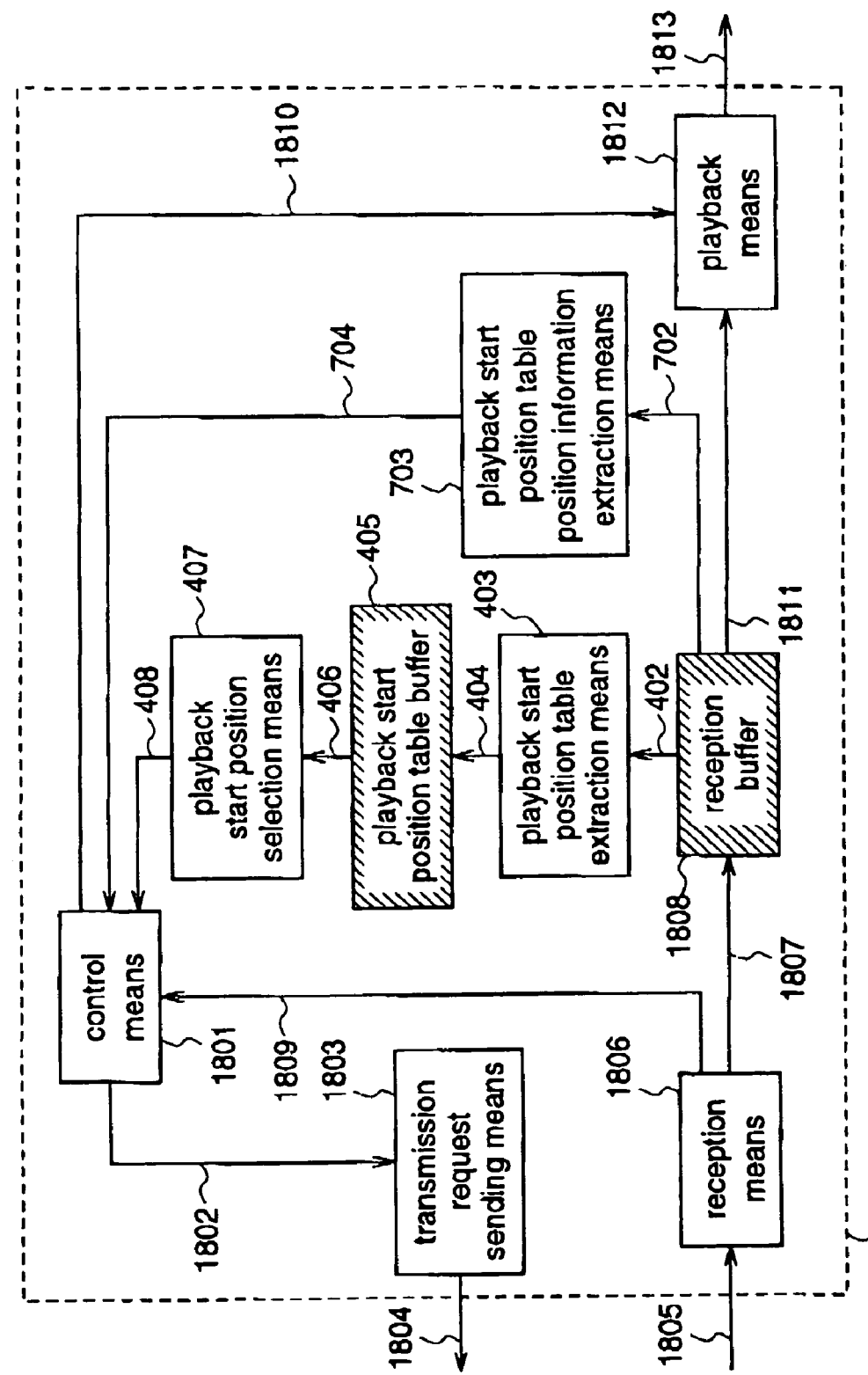
FIG. 7 is a block diagram illustrating the construction of the data reception/playback apparatus according to the second embodiment.

FIG. 7 is a block diagram illustrating a data reception/playback apparatus which receives the stream data in the format shown in FIG. 6 and which realizes jump playback. In FIG. 7, the same reference numerals as those described for the data reception/playback apparatuses shown in FIGS. 4 and 18 denote the same components and signals.

The data reception/playback apparatus 701 comprises a control means 1801; a transmission request sending means 1803; a reception means 1806; a reception buffer 1808; a playback means 1812; a playback start position table extraction means 403; a playback start position table buffer 405; a playback start position table selection means 407; and a playback start position table position information extraction means 703 for extracting information indicating the position of a playback start position table in a file.

The data reception/playback apparatus 701 so constructed operates as follows. The control means 1801 instructs the transmission request sending means 1803 to make a request for the transmission of a file containing stream data, a playback start position table, and information about the position of the playback start position table. Then, the transmission request sending means 1803 sends a transmission request 1804 to the transmission apparatus.

The transmission apparatus transmits the requested file to the reception/playback apparatus based on the transmission request 1804.

When the file corresponding to the transmission request 1804 is transmitted from the transmission apparatus, the reception means 1806 of the data reception/playback apparatus 701 receives a transmission response 1805 to the transmission request 1804 and stores the file in the reception buffer 1808.

The playback start position table position information extraction means 703 extracts the information 601 about the position of the playback start position table, and outputs the extracted information about the position of the playback start position table 704 to the control means 1801.

Upon receipt of the positional information 704, the control means 1801 decides whether the data is to be played from the head of the file or from some midpoint in the file. When the data is to be played from the head of the file, the following stream data storage area is received and played.

On the other hand, when the data is to be played from some midpoint in the file, data reception is temporarily halted, and the control means 1801 notifies the transmission request sending means 1803 of the position of the playback start position table which is indicated by the positional information 704 extracted by the positional information extraction means 703, and the transmission request sending means 1803 sends the positional information 704 as a file transmission request 1804 to the transmission apparatus.

Upon receipt of the transmission request 1804, the transmission apparatus transmits to the data reception/playback apparatus 701 file data (playback start position table) in the position which is indicated by the transmission request 1804.

The reception means 1806 of the data reception/playback apparatus 701 receives the playback start position table as a transmission response 1805 to the transmission request 1804, and stores the playback start position table in the reception buffer 1808. The playback start position table extraction means 403 extracts the playback start position table 404 from the buffer 1808, and outputs the extracted playback start position table 404 to the playback start position table buffer 405.

After the playback start position table extraction means 403 extracts the playback start position table 404 from the playback start position table buffer 405, the control means 1801 decides whether the data is to be played from the head of the file or from some midpoint in the file. When the data is to be played from the head of the file, the stream data storage area is subsequently received and played. On the other hand, when the data is to be played from some midpoint in the file, data reception is temporarily halted, and data playback is performed from the playback start position 408 which is selected from the playback start position table by the playback start position selection means 407.

As described above, since the information about the position of the playback start position table is stored in the vicinity of the head of the file, the data reception/playback apparatus can extract the playback start position table stored in the file, and can obtain the transmission start position table in advance of data reception. Therefore, even when the data reception/playback apparatus receives the stream data from some midpoint in the stream, the data reception/playback apparatus can correctly play the stream data, thereby realizing the jump playback function.

In the first and second embodiments, the head position of each unit in a file format is used as an example of a playback start position. However, the playback start position depends on the stream data coding method. When data playback can be started only from the head unit of an intra-frame coded file, only the head unit of the intra-frame coded file may be used as a playback start position.

Further, in the first and second embodiments, a request for the transmission of the playback start position table is made before starting data playback. However, a once received playback start position table may be stored, and this stored table may be used for data playback when starting second or later playback for the same data, without making a request for the table.

Furthermore, in the first and second embodiments, the data reception/playback apparatus obtains the playback start position table from the file every time before starting data playback. However, since the data reception/playback apparatus does not need the playback start position table when playing the data from the head of the file, the data reception/playback apparatus may obtain the table only when performing jump playback.

Furthermore, in the second embodiment, the data reception/playback apparatus obtains the information about the position of the playback start position table before starting data playback and, thereafter, the data playback/reception apparatus obtains the playback start position table. However, a once received information about the position of the playback start position table may be stored (when playing the data from the head of the file, only the information about the position of the playback start position table is obtained and stored), and the stored information may be used to obtain the playback start position table only when performing a second or later jump playback for the same data.

Moreover, although, in the first and second embodiments, the data reception/playback apparatus makes a request for transmission of the whole playback start position table stored in the transmission apparatus, the data reception/playback apparatus may make a request for the transmission of a part of the playback start position table which is stored in the transmission apparatus.

Furthermore, the data transmission protocol to be used in this second embodiment is not restricted to the HTTP. Other protocols having similar functions may be used.

Third Embodiment

Hereinafter, a data reception/playback apparatus and a data reception/playback method according to a third embodiment of the present invention will be described with reference to FIG. 8.

The data reception/playback apparatus and method according to the third embodiment are applicable to data transmission using a transmission protocol such as the HTTP, wherein transmission of data is halted by halting reception of data from a lower communication protocol, thereby temporarily halting data playback in a data playback unit.

Figure 8:
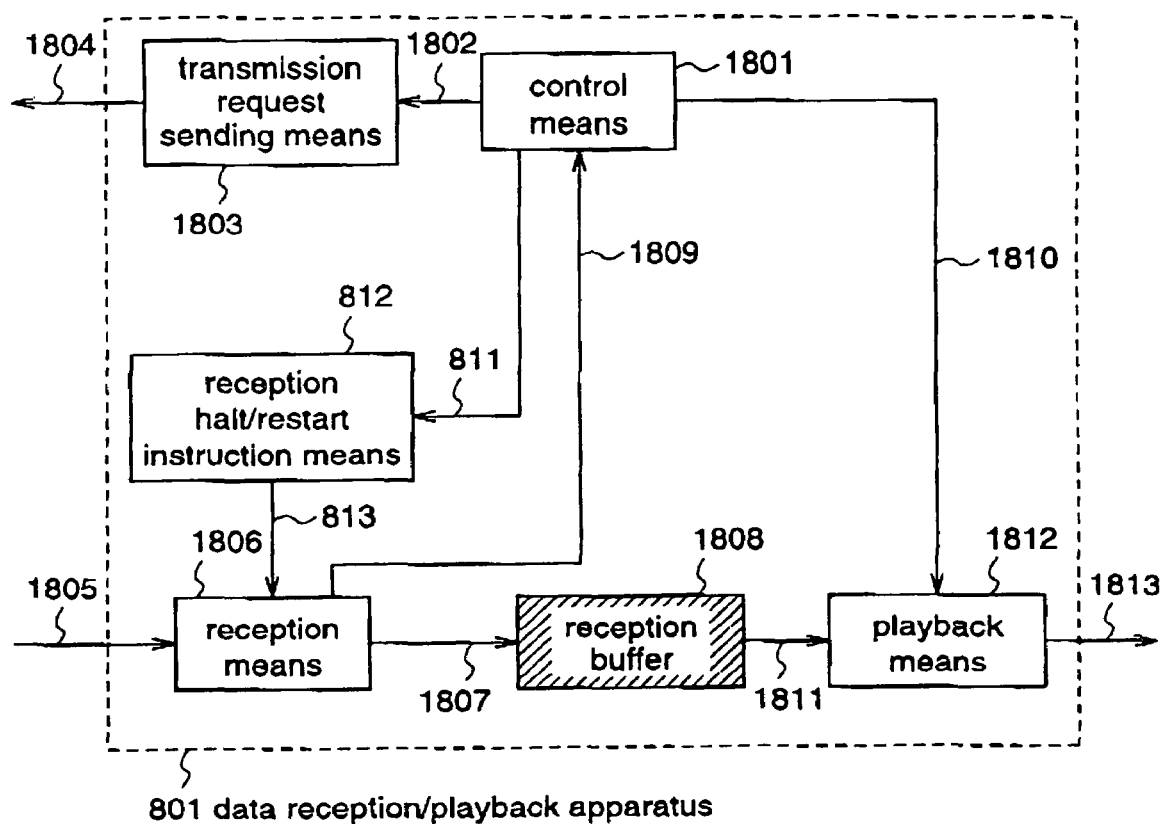
FIG. 8 is a block diagram illustrating the construction of a data reception/playback apparatus according to a third embodiment of the invention.
Figure 9:
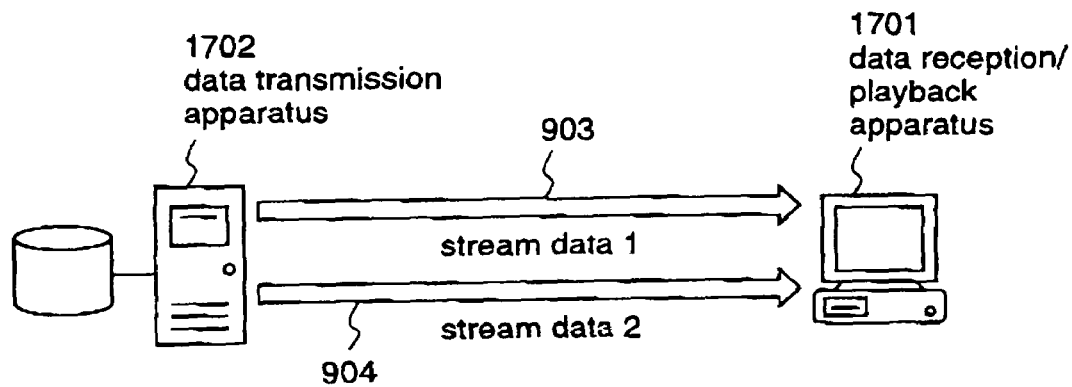
FIG. 9 is a conceptual diagram illustrating the manner of simultaneously transmitting/receiving plural stream data.
Figure 10:
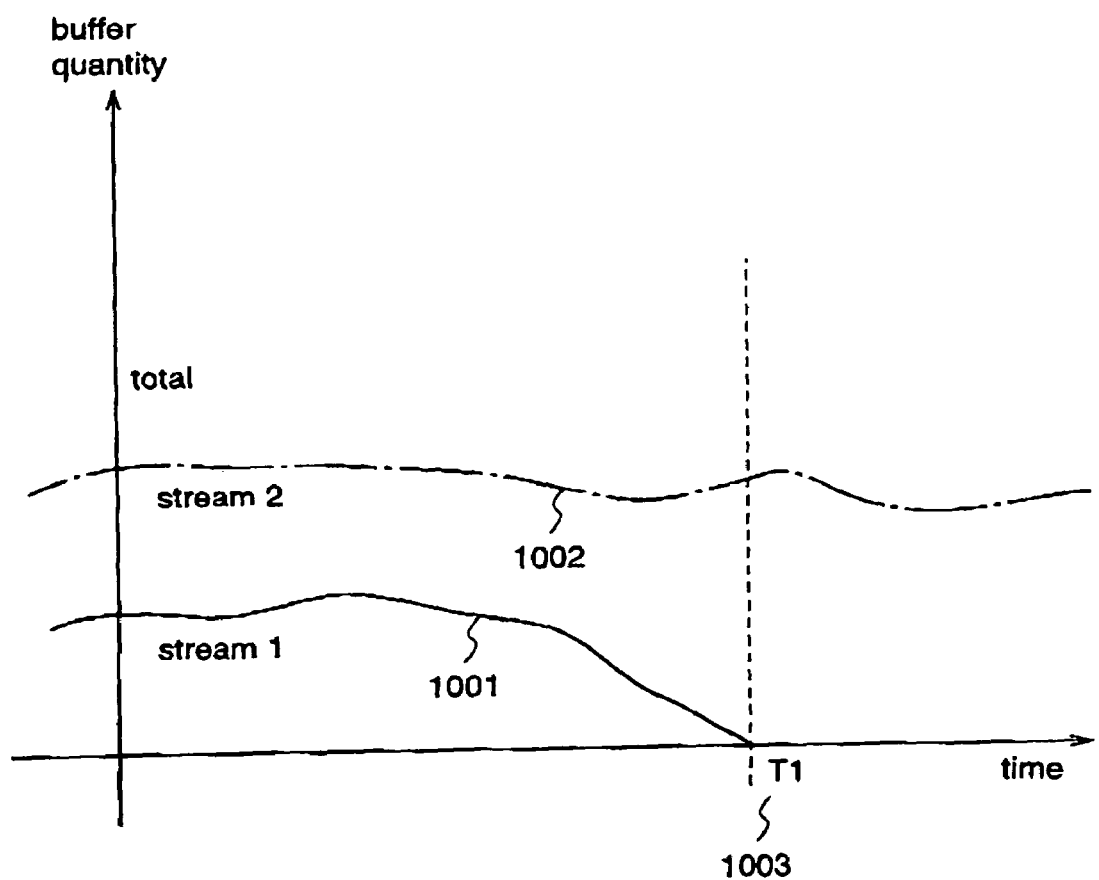
FIG. 10 is a graph illustrating the quantity of data in a reception buffer when plural stream data are simultaneously transmitted/received.
Figure 11:
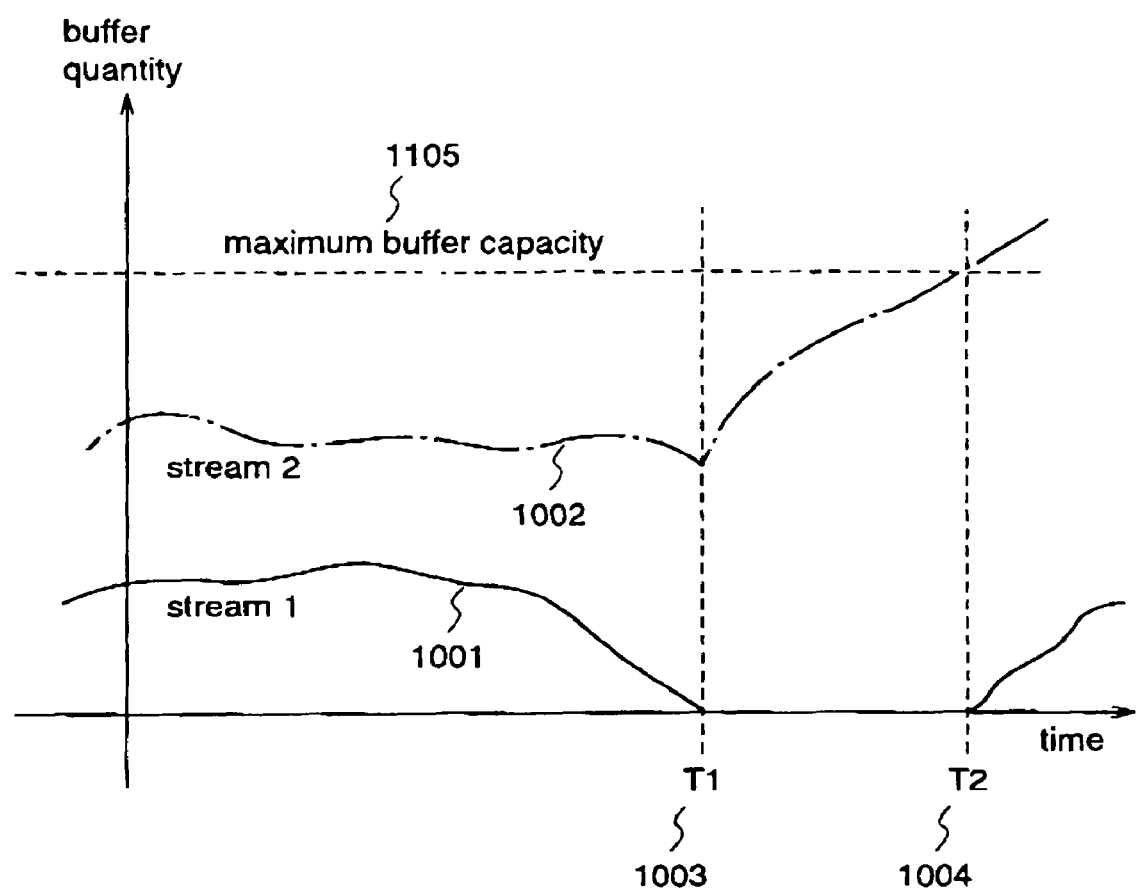
FIG. 11 is a graph illustrating the quantity of data in a reception buffer when plural stream data are simultaneously transmitted/received, in the case where data playback is halted when the reception buffer becomes empty.

FIG. 8 is a block diagram illustrating a data reception/playback apparatus 801 according to the third embodiment. In FIG. 8, the same reference numerals as those described for the conventional apparatus shown in FIG. 18 denote the same components and signals.

The data reception/playback apparatus 801 comprises a control means 1801, a transmission request sending means 1803, a reception means 1806, a reception buffer 1808, a playback means 1812, and a reception halt/restart instruction means 812.

The data reception/playback apparatus 801 so constructed operates as follows.

Initially, the data reception/playback apparatus 801 starts data playback in a similar manner as described for the conventional apparatus 1701. When a temporary halt is requested by the user of the data reception/playback apparatus 801 or the like, the control means 1801 gives an instruction 811 of a temporary halt to the reception halt/restart instruction means 812. The reception halt/restart instruction means 812 instructs 813 the reception means 1806 to halt data reception.

Hereinafter, the method of halting data reception will be described. The HTTP employs TCP (Transport Control Protocol) as a lower protocol. So long as the HTTP receives no data from the processing section of the TCP, the buffer of the TCP, which is called a window buffer, is filled up in due time. At this time, the TCP processing section notifies the transmission apparatus that the size of the window buffer is 0. Upon receipt of this notification, the transmission apparatus halts data transmission. Since data transmission is halted as described above, data playback is halted.

The following process is performed to restart data playback. That is, the reception halt/restart instruction means 812 instructs 813 the reception means 1806 to restart data reception, and the control means 1801 instructs 1810 the playback means 1812 to perform data playback.

The above-described construction and operation of the data reception/playback apparatus allow for a temporary halt and restart of data playback.

As another method for halting and restarting data playback, the data reception/playback method described for the first or second embodiment may be employed. To be specific, the data reception/playback apparatus stores the byte position of the stream data, which has been received, when halting data playback, and thereafter, disconnects the HTTP. When restarting playback, the apparatus connects the HTTP, and specifies a transmission range by the data reception/playback method described for the first or second embodiment based on the stored byte position, and requests the transmission apparatus to transmit stream data.

Thereby, a temporary halt and restart of data playback are achieved in the data reception/playback apparatus.

Fourth Embodiment

Hereinafter, a data reception/playback apparatus and a data reception/playback method according to a fourth embodiment of the present invention will be described with reference to FIG. 12.

The data reception/playback apparatus and method according to the fourth embodiment avoid degradation of image quality and overflow of the reception buffer even when transmission delay occurs due to network congestion wherein plural stream data are simultaneously received and played.

Figure 12:
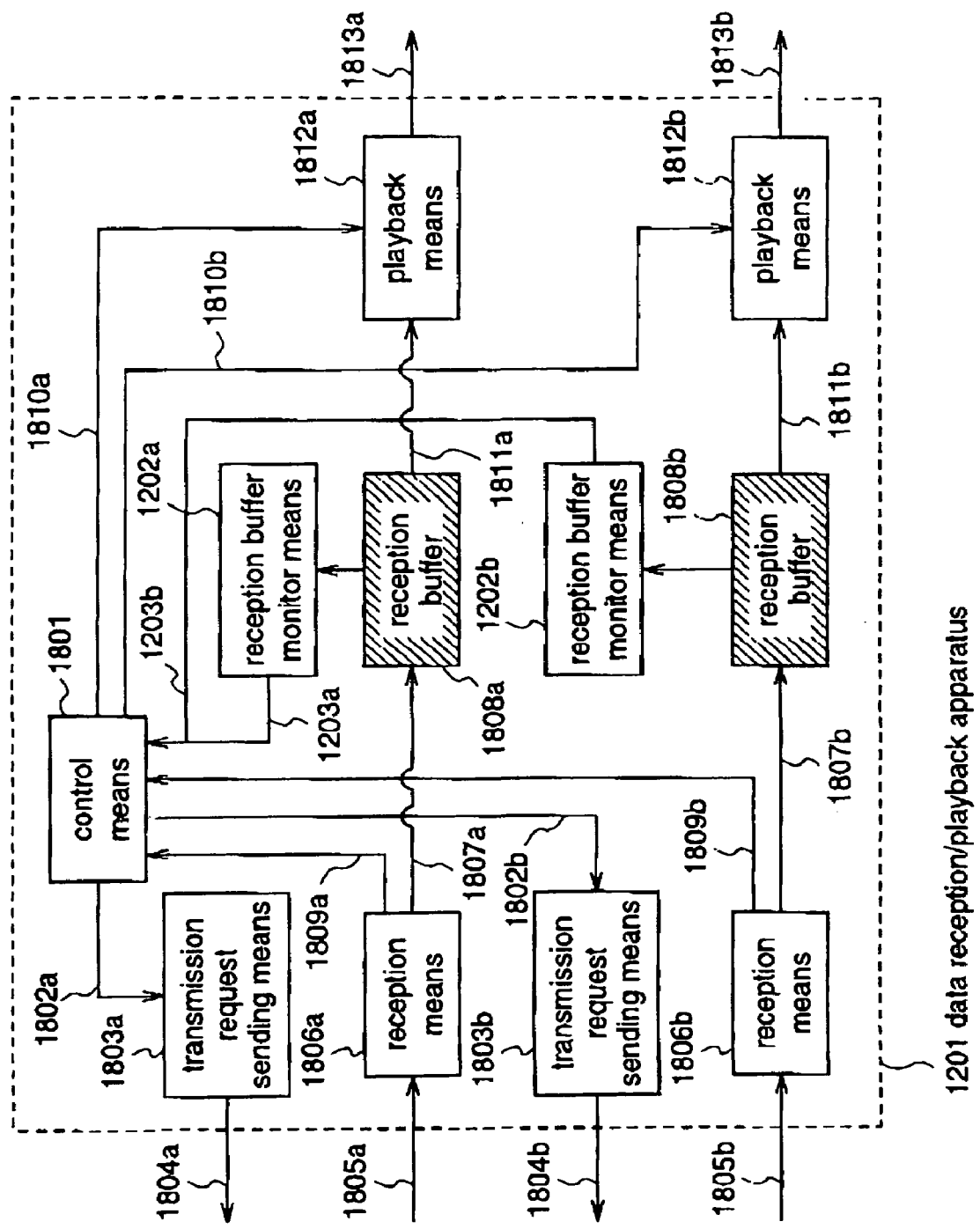
FIG. 12 is a block diagram illustrating the construction of a data reception/playback apparatus according to a fourth embodiment of the invention.

FIG. 12 is a block diagram illustrating the data reception/playback apparatus 1201 according to the fourth embodiment. In FIG. 12, the same reference numerals as those described for the conventional data reception/playback apparatus shown in FIG. 18 denote the same components and signals. Reference numerals with a trailing "a" or "b" correspond to the same reference numerals without "a" or "b" shown in FIG. 18.

The data reception/playback apparatus 1201 comprises a control means 1801, a transmission request sending means 1803a and 1803b, reception means 1806a and 1806b, reception buffers 1808a and 1808b, playback means 1812a and 1812b, and reception buffer monitor means 1202a and 1202b for monitoring the quantity of data being stored in the reception buffers 1808a and 1808b.

The data reception/playback apparatus 1201 so constructed operates as follows.

The control means 1801 instructs the transmission request sending means 1803a and 1803b to request the transmission of data from the transmission apparatus. The transmission request sending means 1803a transmits a transmission request 1804a to the transmission apparatus, while the transmission request sending means 1803b transmits a transmission request 1804b to the transmission apparatus.

The reception means 1806a receives a transmission response 1805a to the transmission request 1804a and stores the transmission response 1805a in the reception buffer 1808a. The reception means 1806b receives a transmission response 1805b to the transmission request 1804b and stores the transmission response 1805b in the reception buffer 1808b.

The reception buffer monitor means 1202a monitors the quantity of data stored in the reception buffer 1808a. The reception buffer monitor means 1202b monitors the quantity of data stored in the reception buffer 1808b.

It is assumed that, as the result of transmission delay due to network congestion, the quantity of data received by either the reception means 1806a or 1806b decreases and thereby the reception buffer which stores the received data becomes empty. In this case, the data reception/playback apparatus according to the fourth embodiment operates as follows.

Figure 13:
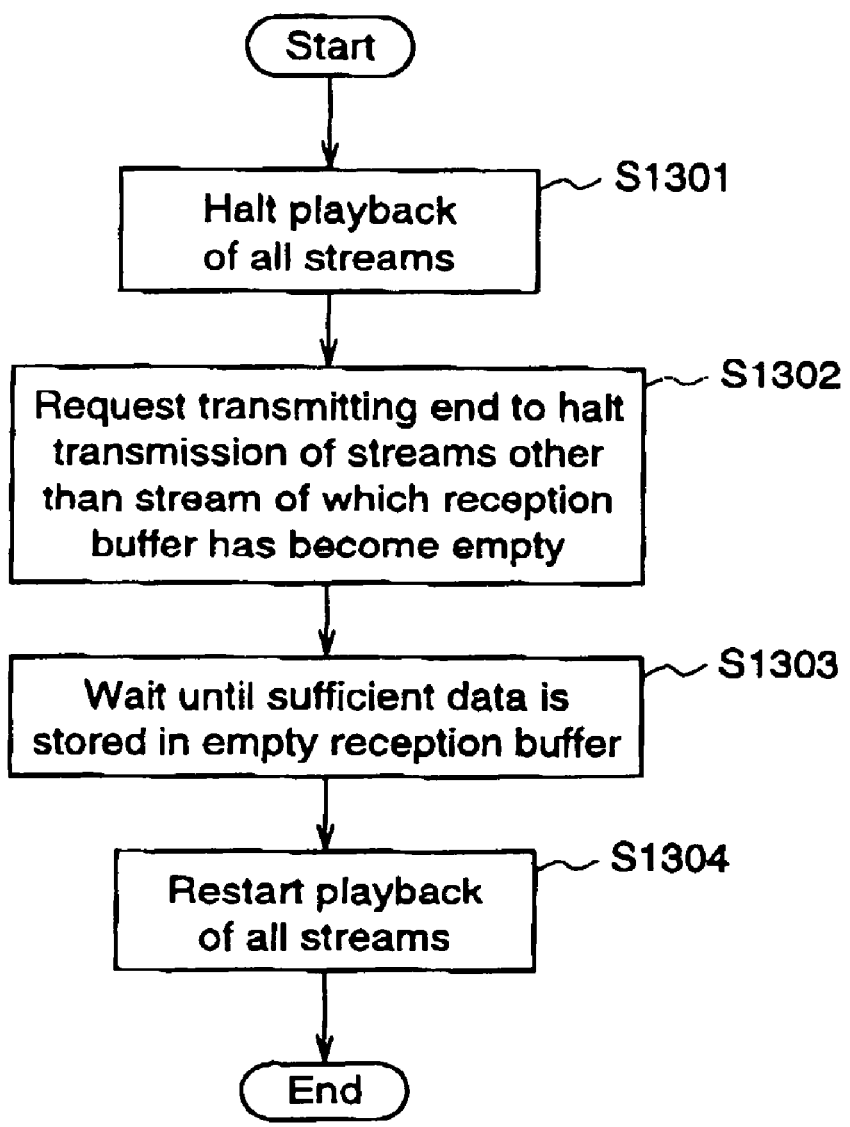
FIG. 13 is a flowchart illustrating the operation of the data reception/playback apparatus according to the fourth embodiment.

FIG. 13 is a flowchart for explaining the operation of the data reception/playback apparatus according to the fourth embodiment. When either the reception buffer 1808a or 1808b becomes empty, playback of all stream data is halted (S1301). Next, a request for halting data transmission is sent to the transmission apparatus, with respect to the connections which receives the stream data other than the stream data corresponding to the reception buffer which has become empty (S1302).

As a method for halting and restarting data reception, the method described for the third embodiment may be used. That is, data playback is halted until a predetermined quantity of data is stored in the reception buffer which has become empty (S1303). When a predetermined quantity of data is stored in the reception buffer, data playback for all streams is restarted (S1304).

Figure 14:
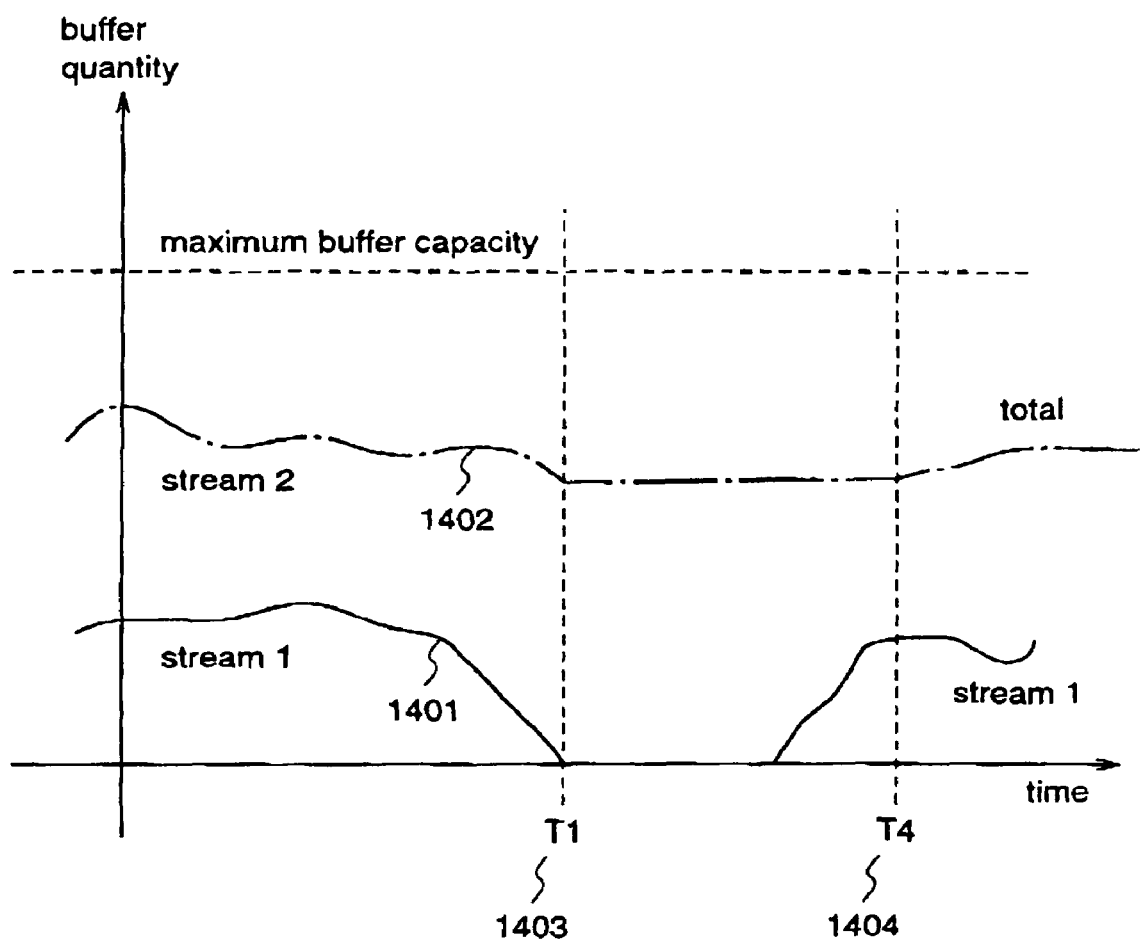
FIG. 14 is a graph illustrating the quantity of data in a reception buffer of the data reception/playback apparatus according to the fourth embodiment.

FIG. 14 is a graph illustrating the quantity of data stored in the reception buffer according to the above-described operation flow.

At time T1 (1403), the buffer for stream 1 (1401) becomes empty. At this time, playback of all streams is halted. At time T4 (1404), the quantity of data of stream 1 (1401) exceeds a predetermined value and, therefore, playback of all streams is restarted.

As described above, when plural stream data are simultaneously received for synchronous playback, if the quantity of data in a first reception buffer becomes zero, playback of all stream data is halted, and transmission of stream data other than the stream data which is delayed in reception is suspended. When the quantity of stream data which is delayed in reception exceeds a predetermined value, playback of all stream data and suspended transmission of stream data are restarted, whereby data playback can be performed without loss of synchronization and overflow of buffer even when plural streams are received simultaneously.

While two pieces of stream data are processed in the fourth embodiment, the above-mentioned method is applicable to processing three or more pieces of stream data.

Further, while data playback is halted when the reception buffer becomes empty in the fourth embodiment, data playback may be halted when the quantity of data in the reception buffer becomes smaller than a predetermined value or when a difference between the display time information of received stream data and the present time becomes shorter than a predetermined period.

Furthermore, the data transmission protocol according to this fourth embodiment is not restricted to the HTTP. Any other protocol may be used so long as it can control transmission of plural stream data independently. For example, RTSP (Real Time Streaming Protocol) or RTP (Realtime Transport Protocol) may be used.

Fifth Embodiment

Hereinafter, a data transmission apparatus and a data transmission method according to a fifth embodiment of the present invention will be described with reference to FIGS. 15 and 16.

In this fifth embodiment, the data transmission apparatus stores plural pieces of stream data having different playback speeds, and stream data to be transmitted is switched according to a playback speed requested by a data reception/playback apparatus.

Figure 15:
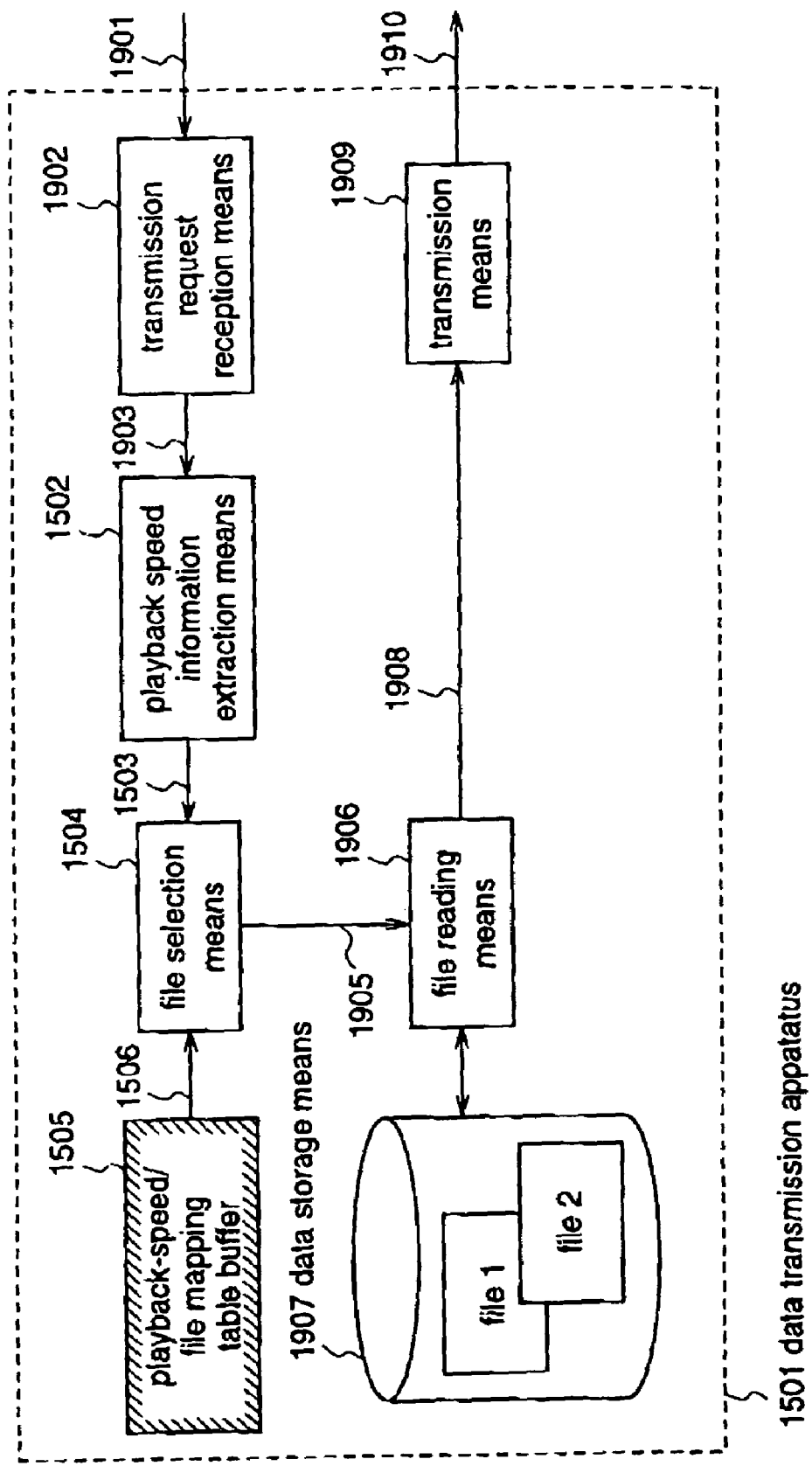
FIG. 15 is a block diagram illustrating the construction of a data transmission apparatus according to a fifth embodiment of the invention.
Figure 17:
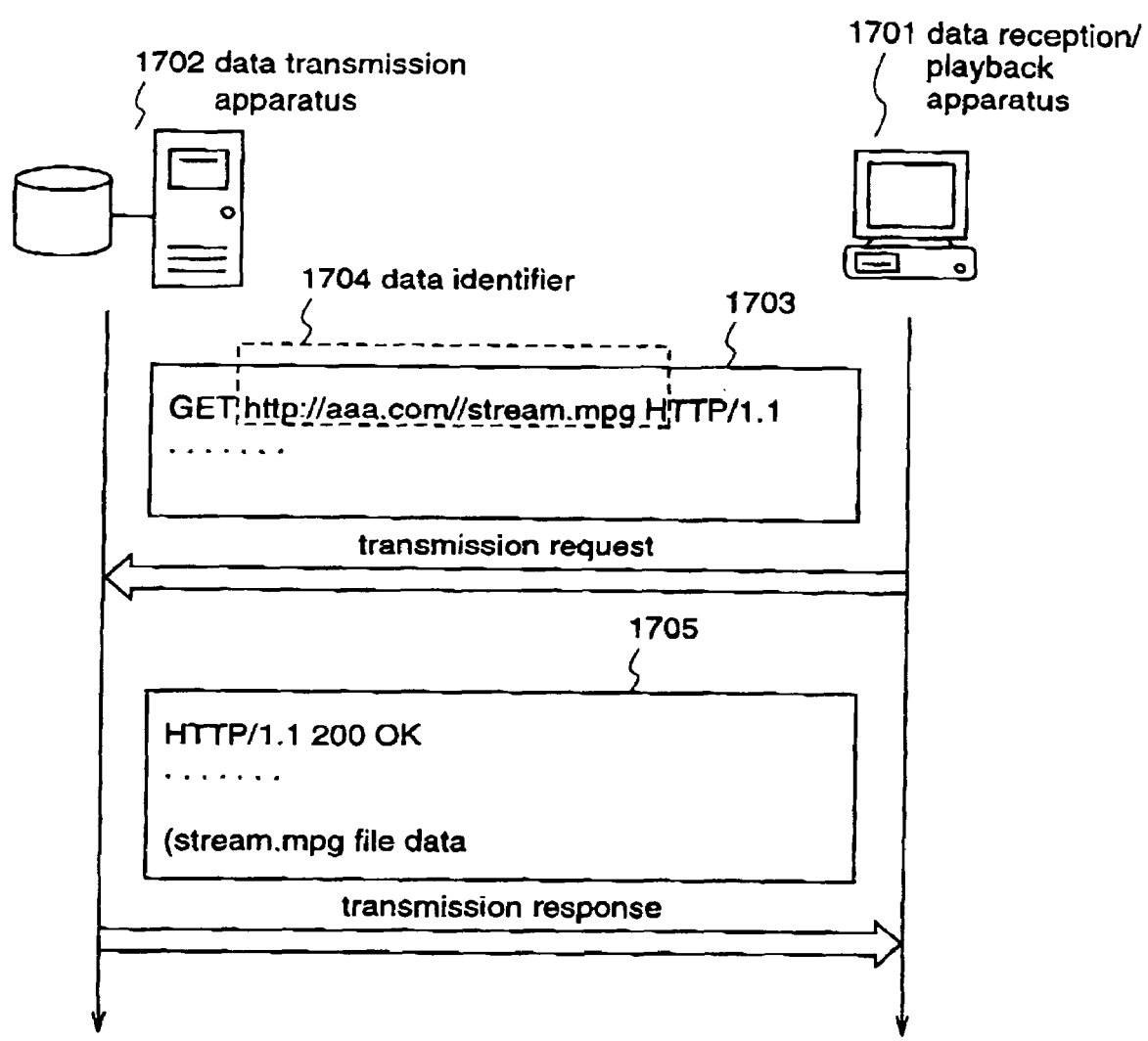
FIG. 17 is a diagram illustrating the flow of transmission and reception according to HTTP.
Figure 19:
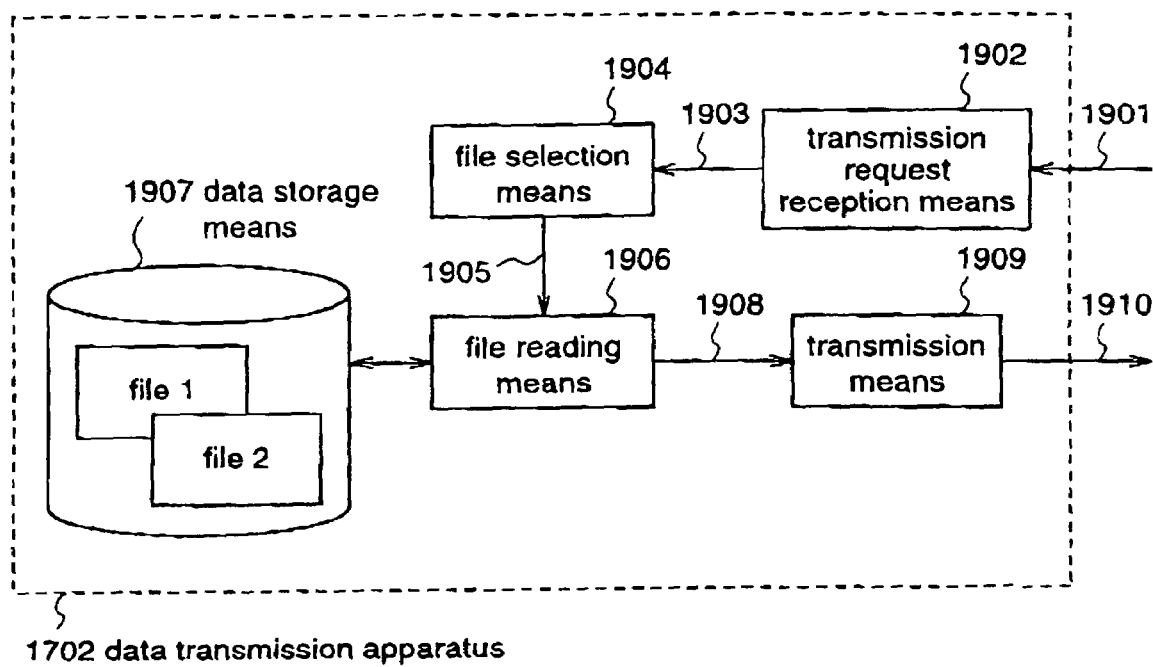
FIG. 19 is a block diagram illustrating the conventional data transmission apparatus.

FIG. 15 is a block diagram illustrating the data transmission apparatus according to the fifth embodiment of the invention. In FIG. 15, the same reference numerals as those described for the conventional transmission apparatus shown in FIG. 19 denote the same components and signals.

The data transmission apparatus 1501 comprises: a transmission request reception means 1902; a playback speed information extraction means 1502 for extracting playback speed information from a transmission request received by the transmission request reception means 1902; a file selection means 1504 for selecting a file corresponding to the requested playback speed, according to the playback speed information which is extracted by the extraction means 1502, the data identifier (URI) corresponding to the file, and a playback-speed/file mapping table; a playback-speed/file mapping table buffer 1505 for storing the playback-speed/file mapping table; a data storage means 1907 for storing plural files corresponding to the playback speeds; a file reading means 1906; and a transmission means 1909.

The data transmission apparatus 1501 so constructed operates as follows. It is assumed that a transmission request 1901 from the data reception/transmission apparatus includes information about a playback speed, and usually the playback speed information indicates the ratio to the normal playback speed (e.g., double-speed playback is expressed by 2.0).

The transmission request reception means 1902 receives the transmission request 1901 from the data reception/playback apparatus, and sends the received transmission request 1903 to the playback speed information extraction means 1502. The extraction means 1502 extracts the playback speed information and the data identifier of the requested data from the transmission request 1901, and informs them to the file selection means 1504.

The file selection means 1504 selects a file corresponding to the playback speed, with reference to the playback-speed/file mapping table 1506 stored in the table buffer 1505, the playback speed information, and the data identifier.

FIG. 16 shows an example of a playback-speed/file mapping table, wherein reference numeral 1601 is a column showing playback speeds, and reference numeral 1602 is a column showing file names corresponding to the playback speeds. For example, when "1.0" is specified as a playback speed from the data reception/playback apparatus, the file selection means 1504 selects a file name "stream.mpg" corresponding to the playback speed "1.0" based on the playback-speed/file mapping table. The file selection means 1504 sends the selection file information 1905 to the file reading means 1906.

The file reading means 1906 reads the selected file, and outputs the data 1908 of the read file to the transmission means 1909. The transmission means 1909 transmits the file data 1908 which is outputted from the file reading means 1906, as a transmission response 1901, to the data reception/playback apparatus.

As described above, since the transmission apparatus holds the playback-speed/file mapping table and transmits file data corresponding to a transmission speed which is requested by the data reception/playback apparatus, data transmission according to the playback speed is achieved, and the playback speed can be controlled.

The playback-speed/file mapping table may be transmitted from the data transmission apparatus to the data reception/playback apparatus in advance of data transmission, or the data reception/playback apparatus may be provided with the mapping table. In this case, the data reception/playback apparatus selects a file to be requested for transmission, and conducts a transmission request for the selected file.

Furthermore, the data transmission protocol used in this fifth embodiment is not restricted to the HTTP, and other protocols may be used.

What is claimed is:

1. A data reception/playback method for receiving and playing stream data including at least one of audio and video, said method comprising:
   requesting, before receiving the stream data, a transmitting end to transmit part or whole of a playback start position table including at least one position where data playback can be started from some midpoint in the stream data;
   receiving the playback start position table;
   selecting one playback start position from the received playback start position table;
   requesting the transmitting end to transmit the stream data from the selected playback start position; and
   receiving and playing the stream data which has been transmitted from the playback start position.

2. The data reception/playback method of claim 1, wherein:
   the playback start position table is stored in a file which is different from a file containing the stream data;
   transmission of the file containing the playback start position table is requested to the transmitting end before reception of the stream data; and
   the playback start position table is extracted from the received file containing the table.

3. The data reception/playback method of claim 1 wherein:
   the playback start position table, the stream data, and information about the position of the playback start position table are stored in one file;
   transmission of the file is requested to the transmitting end;
   data of the file is received from the transmitting end;
   the information about the position of the playback start position table is extracted from the data of the received file;
   transmission of the file from the position indicated by the information about the position of the playback start position table is requested to the transmitting end; and
   the playback start position table is obtained from the received data.

4. The data reception/playback method of claim 3, wherein the information about the position of the playback start position table is stored at the time of data playback, and the stored information about the position of the playback start position table is used for the next and later data playback.

5. The data reception/playback method of claim 1, wherein the playback start position table received at the time of data playback is stored, and the stored playback start position table is used for the next and later data playback.

6. The data reception/playback method of claim 1, wherein:
   when playing the stream data from the head of the stream, the stream data is received and played without requesting transmission of the playback start position table; and
   when playing the stream data from some midpoint in the stream, transmission of the playback start position table is requested.

7. A data reception/playback apparatus for receiving and playing stream data including at least one of audio and video, said apparatus comprising:
   transmission request sending means for sending a transmission request to a transmission apparatus;
   reception means for receiving data transmitted from the transmission apparatus in response to the transmission request;
   playback start position selection means for selecting a playback start position from a playback start position table where at least one playback start position is stored; and
   playback means for playing the stream data;
   wherein said transmission request sending means requests the transmission apparatus to transmit the playback start position table, said reception means receives the playback start position table, said transmission start position selection means selects a playback start position from the playback start position table, said transmission request sending means requests the transmission apparatus to transmit the stream data from the playback start position, said reception means receives the stream data, and said playback means plays the received stream data.

8. A data reception/playback method for receiving and playing stream data including at least one of audio and video, wherein:
   when receiving and playing plural stream data simultaneously by using plural connections which are individually controllable, if reception of stream data in a connection is delayed for a playback time, playback of all the stream data is halted, and a request for suspension of data transmission in the connections including stream data other than the stream data which is delayed in reception is output to a transmitting end; and
   when the quantity of the stream data which is delayed in reception exceeds a predetermined value, playback of all the stream data is restarted, and a request for restart of data transmission in the suspended connections is output to the transmitting end.

9. A data reception/playback apparatus for receiving and playing stream data including at least one of audio and video, said apparatus comprising:
   transmission request sending means for requesting a transmission apparatus to transmit plural stream data;
   reception means for receiving the stream data;
   a reception buffer for storing the stream data;
   playback means for playing the stream data stored in said reception buffer; and
   reception buffer monitor means for monitoring the quantity of data stored in said reception buffer;
   wherein, when said reception buffer monitor means detects that reception of stream data is delayed for a playback time, said playback means halts playback of all the stream data, and said transmission request sending means requests the transmission apparatus to suspend data transmission in connections including stream data other than the stream data which is delayed in reception; and
   when said reception buffer monitor means detects that the quantity of the stream data which is delayed in reception exceeds a predetermined value, said playback means restarts playback of all the stream data, and said transmission request sending means requests the transmission apparatus to restart data transmission in the connection which is suspended.

10. A data transmission method for transmitting stream data including at least one of audio and video, according to a playback speed specified by a receiving end, said method comprising:
    having a plurality of files containing stream data of different playback speeds;
    receiving a request from the receiving end for transmission of stream data including information of a playback speed;

selecting a file containing stream data corresponding to the playback speed information; and transmitting the data of the selected file.

11. A data transmission apparatus for transmitting stream data including at least one of audio and video according to a playback speed specified by a receiving end, said apparatus comprising:

data storage means having, as files, plural stream data having different playback speeds;

a playback speed/file mapping table buffer containing a playback speed/file mapping table which indicates the correspondences between the playback speeds and the files;

transmission request reception means for receiving and analyzing a request from the receiving end for transmission stream data;

playback speed information extraction means for extracting information of a playback speed, from the transmission request received by said transmission request reception means;

file selection means for selecting a file corresponding to the playback speed with reference to the playback speed/file mapping table stored in said playback speed/file mapping table buffer;

file reading means for reading the file selected by said file selection means from said data storage means; and transmission means for transmitting the data of the file read by said file reading means.

* * * * *

UNITED STATES PATENT AND TRADEMARK OFFICE
CERTIFICATE OF CORRECTION

| | | |
|---|---|---|
| PATENT NO. | : 7,051,110 B2 | Page 1 of 1 |
| APPLICATION NO. | : 09/739648 | |
| DATED | : May 23, 2006 | |
| INVENTOR(S) | : Makoto Hagai et al. | |

It is certified that error appears in the above-identified patent and that said Letters Patent is hereby corrected as shown below:

ON THE TITLE PAGE item [56]

References Cited:

U.S. PATENT DOCUMENTS

Please add reference --U.S. 6,628,302    9/2003    White et al. . . . . . . .715/717--.

Signed and Sealed this

Nineteenth Day of December, 2006

JON W. DUDAS
*Director of the United States Patent and Trademark Office*